(12) United States Patent
Itagaki et al.

(10) Patent No.: US 8,107,127 B2
(45) Date of Patent: *Jan. 31, 2012

(54) IMAGE FORMING APPARATUS, IMAGE FORMING METHOD

(75) Inventors: Tomohisa Itagaki, Abiko (JP); Mitsuhiko Sato, Kashiwa (JP); Tatsuya Goto, Abiko (JP); Katsuhide Koga, Moriya (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,958

(22) Filed: Jan. 31, 2011

(65) Prior Publication Data
US 2011/0122428 A1 May 26, 2011

Related U.S. Application Data

(63) Continuation of application No. 12/550,884, filed on Aug. 31, 2009, now Pat. No. 7,903,287, which is a continuation of application No. 11/692,986, filed on Mar. 29, 2007, now Pat. No. 7,619,792.

(30) Foreign Application Priority Data

Mar. 31, 2006 (JP) ................................. 2006-100379

(51) Int. Cl.
*H04N 1/60* (2006.01)
*H04N 1/46* (2006.01)
*G03F 3/08* (2006.01)
*G06K 9/00* (2006.01)
(52) U.S. Cl. ......... 358/1.9; 358/504; 358/518; 358/520; 382/162; 382/167

(58) Field of Classification Search ................... 358/1.9, 358/406, 504, 1.11, 1.12, 1.13, 1.14, 1.15, 358/447, 429, 448, 535, 536, 3.06, 3.09, 358/518, 520; 347/19, 43, 15; 382/237, 382/248, 162, 167; 707/321, 327; 283/117
See application file for complete search history.

(56) References Cited

U.S. PATENT DOCUMENTS

| 6,289,137 | B1 | 9/2001 | Sugiyama et al. |
| 6,624,903 | B1 | 9/2003 | Miquel et al. |

(Continued)

FOREIGN PATENT DOCUMENTS

JP 62-296669 A 12/1987

(Continued)

OTHER PUBLICATIONS

Office Action issued in corresponding Japanese Patent Application No. 2006-100379 dated Nov. 19, 2010.

*Primary Examiner* — Charlotte M Baker
(74) *Attorney, Agent, or Firm* — Rossi, Kimms & McDowell LLP

(57) ABSTRACT

An image forming apparatus has a calibration mode in which a calibration image is formed on a print medium to correct image forming conditions. The image forming apparatus detects print medium information to determine, on the basis of the print medium information, whether the print medium is a sheet recommended as a print medium for use in the calibration mode. The image forming apparatus sets calibration conditions corresponding to the determined recommended sheet. The image forming apparatus corrects the image forming conditions on the basis of the set calibration conditions.

17 Claims, 28 Drawing Sheets

U.S. PATENT DOCUMENTS

| | | | |
|---|---|---|---|
| 7,092,119 B1* | 8/2006 | Hinds et al. | 358/1.9 |
| 7,697,166 B2 | 4/2010 | Bray | |
| 2004/0212816 A1* | 10/2004 | Tanabe et al. | 358/1.9 |
| 2005/0200866 A1 | 9/2005 | Hoshii et al. | |
| 2006/0176526 A1 | 8/2006 | Iannazzi | |

FOREIGN PATENT DOCUMENTS

| | | |
|---|---|---|
| JP | 1-309082 A | 12/1989 |
| JP | 10-193689 A | 7/1998 |
| JP | 11-184177 A | 9/1999 |
| JP | 2000-241913 A | 9/2000 |
| JP | 2001-270139 A | 10/2001 |
| JP | 2002-344759 A | 11/2002 |
| JP | 2003-324619 A | 11/2003 |
| JP | 2004-082487 A | 3/2004 |
| JP | 2004-138710 A | 5/2004 |
| JP | 3575259 B2 | 7/2004 |
| JP | 2005-022838 A | 1/2005 |
| JP | 2005-103850 A | 4/2005 |
| JP | 2005-169718 A | 6/2005 |

* cited by examiner

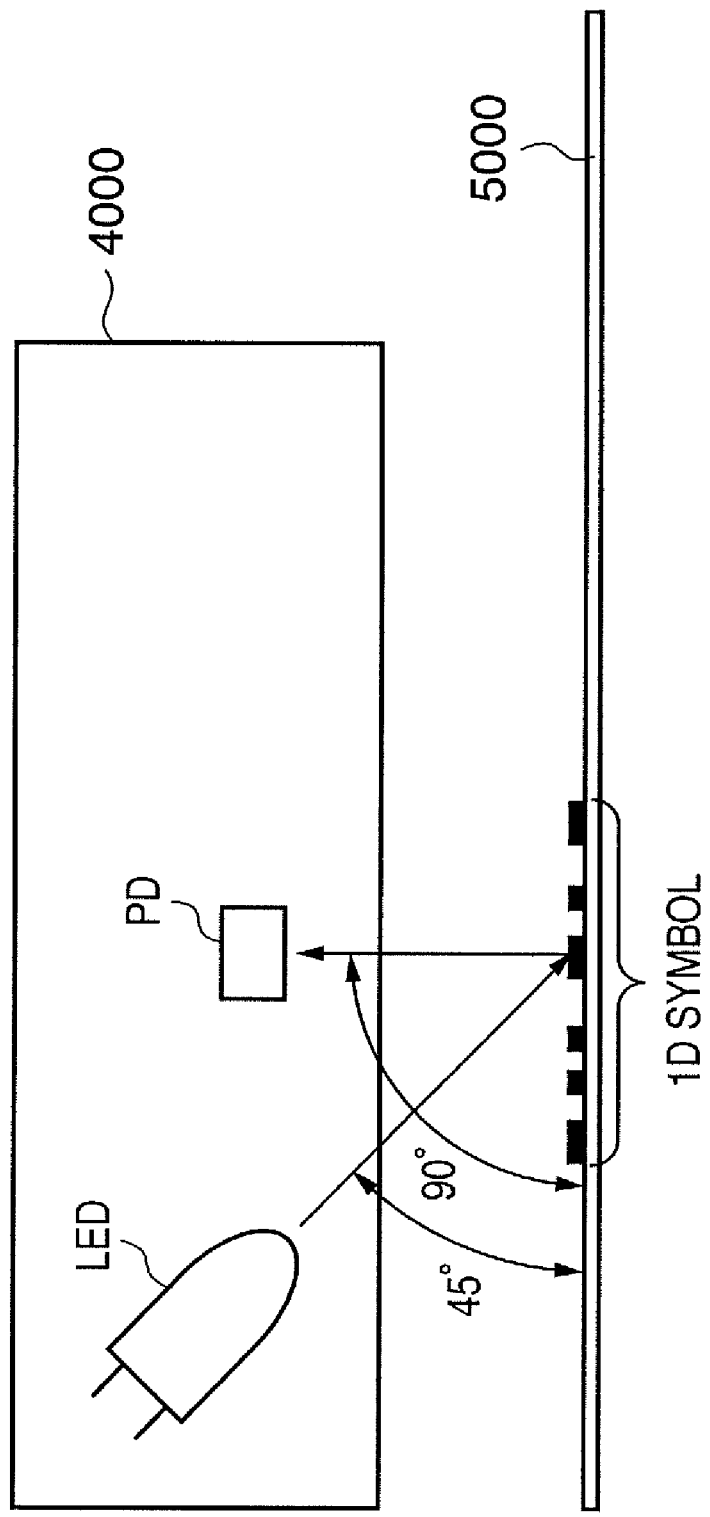

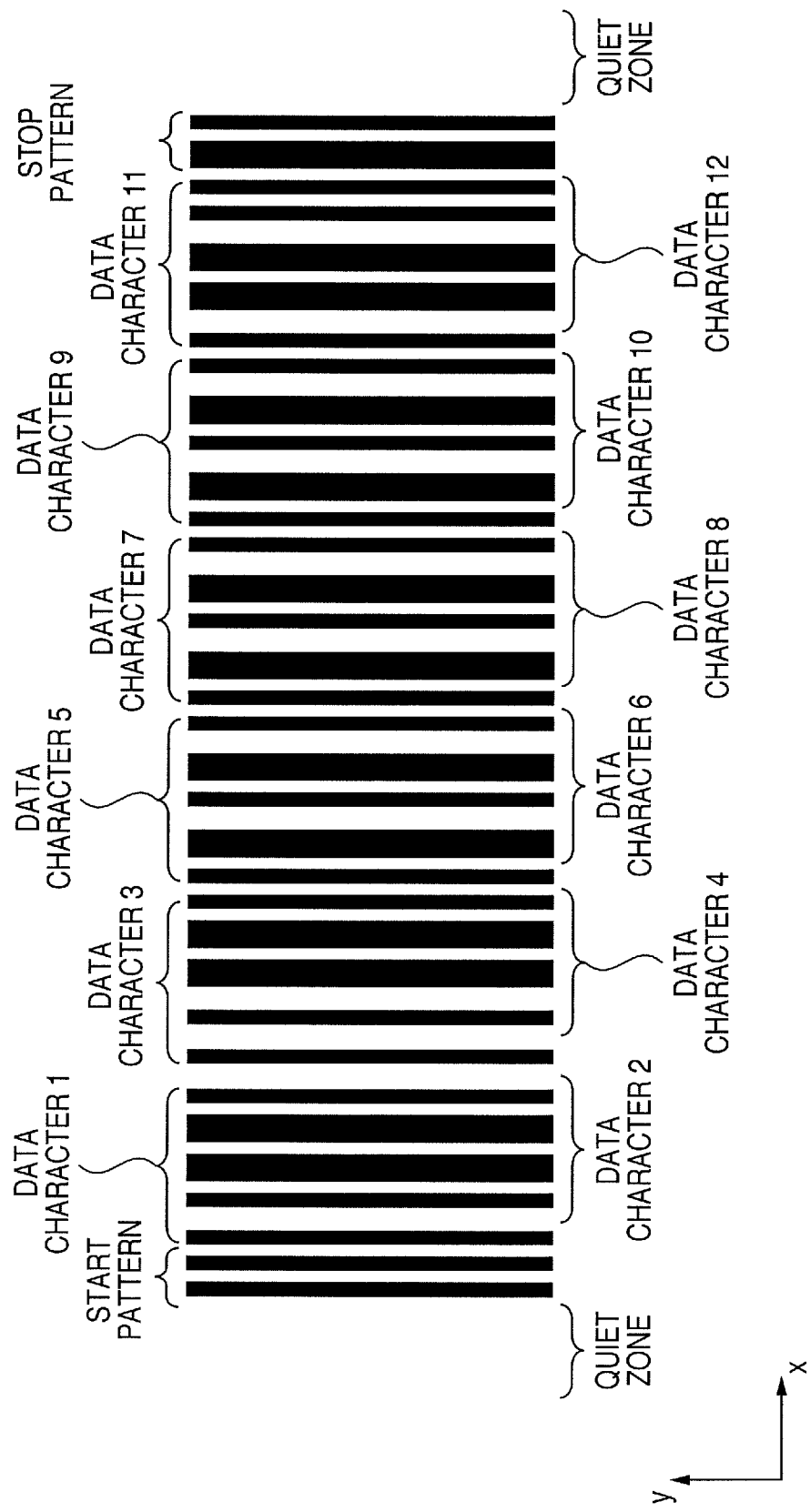

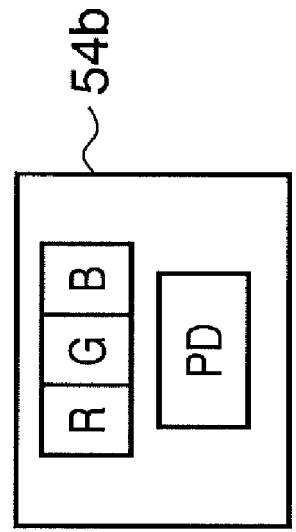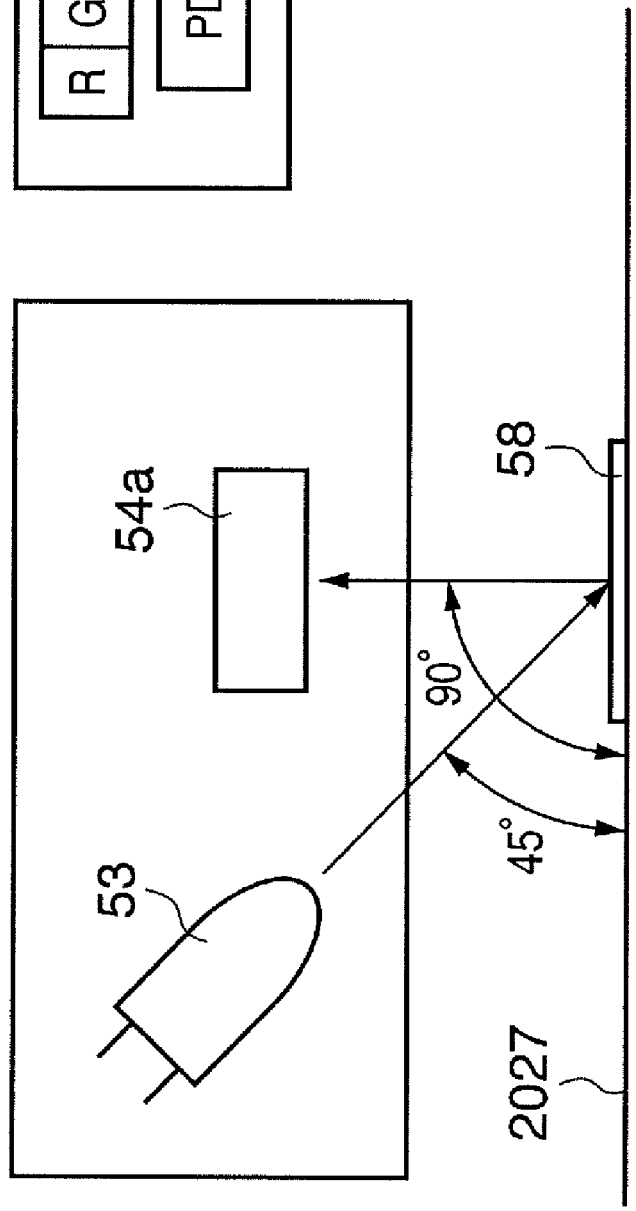

FIG. 15

| CALIBRATION-SPECIFIC SHEET No | TARGET LUMINANCE VALUE |
|---|---|
| 1 | 10 |
| 2 | 15 |
| 3 | 16 |
| 4 | 5 |
| 5 | 6 |
| 6 | 9 |
| 7 | 14 |
| 8 | 15 |
| 9 | 13 |
| OTHER SHEETS | 21 |

F I G. 18
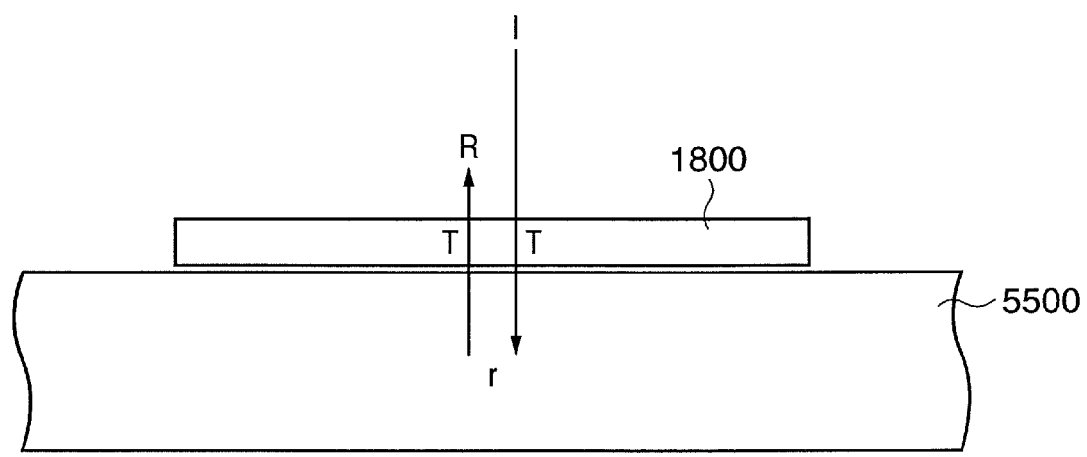

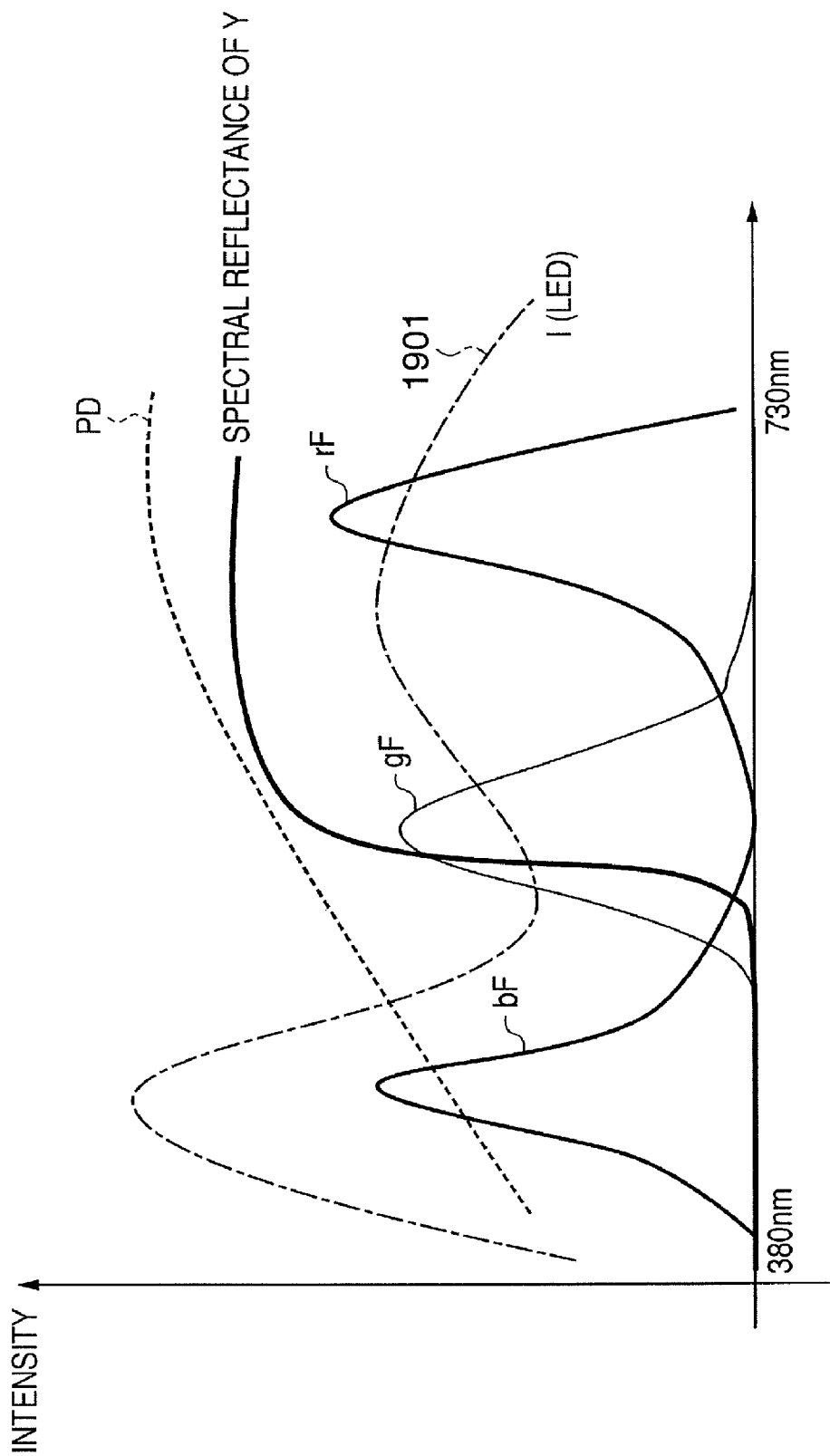

FIG. 20B

| GRAMMAGE (g/m2) | GRAMMAGE COEFFICIENT G |
|---|---|
| 64 | 100.8 |
| 65 | 100.8 |
| 66 | 100.7 |
| 67 | 100.7 |
| 68 | 100.7 |
| 69 | 100.6 |
| 70 | 100.6 |
| 71 | 100.6 |
| 72 | 100.5 |
| 73 | 100.5 |
| 74 | 100.4 |
| 75 | 100.4 |
| 76 | 100.3 |
| 77 | 100.2 |
| 78 | 100.2 |
| 79 | 100.1 |
| 80 | 100.0 |
| 81 | 99.9 |
| 82 | 99.8 |
| 83 | 99.7 |
| 84 | 99.6 |
| 85 | 99.5 |
| 86 | 99.3 |
| 87 | 99.2 |
| 88 | 99.1 |
| 89 | 98.9 |
| 90 | 98.7 |
| 91 | 98.5 |
| 92 | 98.3 |
| 93 | 98.1 |
| 94 | 97.9 |
| 95 | 97.7 |
| 96 | 97.4 |
| 97 | 97.1 |
| 98 | 96.9 |
| 99 | 96.6 |
| 100 | 96.2 |
| 101 | 95.9 |
| 102 | 95.5 |
| 103 | 95.1 |
| 104 | 94.7 |
| 105 | 94.3 |

FIG. 22

| FOR CYAN (%) | DENSITY | LUMINANCE VALUE |
|---|---|---|
| 0 | 0 | 255 |
| 10 | 10 | 200 |
| 20 | 20 | 150 |
| 30 | 35 | 110 |
| 40 | 55 | 80 |
| 50 | 75 | 60 |
| 60 | 100 | 40 |
| 70 | 130 | 25 |
| 80 | 160 | 15 |
| 90 | 200 | 10 |
| 100 | 255 | 0 |

IMAGE FORMING APPARATUS, IMAGE FORMING METHOD

CROSS REFERENCE TO RELATED APPLICATION

This is a continuation of and claims priority from U.S. patent application Ser. No. 12/550,884 filed Aug. 31, 2009, which is a continuation of and claims priority from U.S. patent application Ser. No. 11/692,986 filed Mar. 29, 2007, now patented as U.S. Pat. No. 7,619,792 issued on Nov. 17, 2009, the contents of which are incorporated herein by reference.

BACKGROUND OF THE INVENTION

1. Field of the Invention

The present invention relates to an image forming apparatus and an image forming method.

2. Description of the Related Art

An image forming apparatus comprises a stabilization controller to ensure color stability on a print medium. For example, Japanese Patent Laid-Open No. 1-309082 discloses a technique of reading a toner density detection patch pattern formed on a photosensitive member by a density sensor, and feeding back the read patch pattern to a toner density controller in a developing portion to adjust to the desired density.

In general, a toner patch is easily created and erased, but can provide only density information before fixing. The density information does not reflect the influence after the fixing process and subsequent processes when toner patch-based control is done.

To solve this problem, Japanese Patent Laid-Open No. 62-296669 proposes a technique of reading an image by a reader assembled into the image forming apparatus main body, and controlling image formation on the basis of the read result.

Further, Japanese Patent Laid-Open No. 10-193689 discloses a technique of inserting a sensor in the convey path following fixation in order to sense an output image.

Japanese Patent Laid-Open No. 2002-344759 discloses a technique of adjusting, in correspondence with color detection, the balance (gray balance) of achromatic color to which one is visually sensitive.

It is known that an inkjet printer, which is another example of an image forming apparatus, suffers color variations due to gradual change in the ink discharge amount over time, environmental differences, the individual difference of the ink cartridge, or the like. To prevent this, some products of image forming apparatuses have already been introduced into the market, in which a density sensor is attached beside the ink head to accurately grasp color stability after ink application and control image formation.

Techniques of properly controlling density can be generally classified into control (stabilization control) as disclosed in Japanese Patent Laid-Open No. 1-309082, and control (automatic tone correction) to adjust density tone and the maximum amount of toner application (density) of the color material using the result of printing on a sheet, as disclosed in Japanese Patent Laid-Open No. 62-296669.

A purpose of automatic tone correction is to control the amount of color material by adjusting image forming conditions and provides a stable image forming apparatus by always using a predetermined color material. If the detection signal to detect luminance changes depending on the sheet, the amount of toner application of the color material changes depending on the sheet type. It is, therefore, important to execute calibration using a sheet (reference sheet) recommended by the image forming apparatus manufacturer in automatic tone correction. The recommended sheet generally varies between countries where apparatuses are on sale, and between color and monochrome image forming apparatuses. In most cases, the user does not recognize the sheet type in the sheet feed cassette. Some image forming apparatuses exclusively use output from the manual feeder in automatic tone correction.

From another viewpoint, the reader of the image forming apparatus has a mechanism of correcting, using a reference plate called a shading plate, in-plane no uniformity, gradual deterioration, and contamination. However, it is difficult to arrange a reference plate for a sensor or the like at the fixing convey portion because of space limitations, contamination, and the like. To solve this problem, Japanese Patent Registration No. 03575259 proposes a technique of correcting a sensor using an image-free sheet.

In many cases, the user does not use the recommended sheet in automatic tone correction. In practice, the user executes automatic tone correction with another sheet different from the recommended sheet. If the user does not use the recommended sheet, the amount of toner application of the color material cannot reach a specified amount. The color material is not fixed onto a sheet to cause a fixing offset, and the color material scatters more to degrade the image quality.

Japanese Patent Registration No. 03575259 discloses an arrangement which adopts a reflecting plate in consideration of the sheet transmittance depending on the sheet thickness. However, this arrangement does not consider reflected light at the boundary between the sheet and the color material after transmission. The arrangement in Japanese Patent Registration No. 03575259 cannot cope with sheet type changes (spectral reflectance of the sheet). Also in this case, a mechanism which prompts the user to use the recommended sheet is necessary.

Japanese Patent Laid-Open No. 2004-138710 discloses an arrangement in which the type of print material (plain sheet, OHP, or thick sheet) is detected and a color sensor detects a chromaticity control toner patch fixed on the print material. A plurality of calibration tables specific to print materials are updated on the basis of the detected type of print material and information from the color sensor.

However, Japanese Patent Laid-Open No. 2004-138710 does not disclose an arrangement which executes calibration using a sheet recommended by the apparatus manufacturer in automatic tone correction. Also, Japanese Patent Laid-Open No. 2004-138710 does not disclose an arrangement which determines the type of recommended sheet and whether the sheet is recommended. Japanese Patent Laid-Open No. 2004-138710 does not disclose an arrangement for calibration conditions corresponding to each recommended sheet when adjusting the maximum amount of toner application of the color material in order to implement the maximum amount of toner application of the color material formable by the apparatus. Further, Japanese Patent Laid-Open No. 2004-138710 discloses neither an arrangement which sets the maximum amount of toner application of the color material for a sheet other than the recommended sheet to be smaller than that for the recommended sheet, nor an arrangement which performs luminance-density conversion corresponding to each recommended sheet in tone correction.

For this reason, the arrangement in Japanese Patent Laid-Open No. 2004-138710 can obtain neither a constant maximum amount of toner application of the color material nor proper tone regardless of the type of recommended sheet.

SUMMARY OF THE INVENTION

The present invention has been made to overcome the conventional drawbacks, and has as its object to provide an image forming technique of suppressing image errors and implementing high image quality by performing tone correction in accordance with the type of recommended sheet for use.

It is another object of the present invention to provide a storage medium available to correct image forming conditions in an image forming apparatus.

Embodiments of the present invention are provided to overcome the above-described drawbacks of the related technology.

According to an aspect of the present invention, an embodiment is directed to an image forming apparatus having a calibration mode in which a calibration image is formed on a print medium to correct an image forming condition, comprising:

a detection portion adapted to detect information on the print medium;

a determination portion adapted to determine, on the basis of the information on the print medium detected by the detection portion, whether the print medium is a sheet recommended as a print medium for use in the calibration mode;

a setting portion adapted to set a calibration condition corresponding to the recommended sheet on the basis of the determination portion; and a correction portion adapted to correct the image forming condition on the basis of the calibration condition set by the setting portion.

According to another aspect of the present invention, an embodiment is directed to an image forming method for an image forming apparatus having a calibration mode in which a calibration image is formed on a print medium to correct an image forming condition, comprising:

a detection step of detecting information on the print medium;

a determination step of determining, on the basis of the information on the print medium detected in the detection step, whether the print medium is a sheet recommended as a print medium for use in the calibration mode;

a setting step of setting a calibration condition corresponding to the recommended sheet on the basis of the determination step; and a correction step of correcting the image forming condition on the basis of the calibration condition set in the setting step.

The present invention can provide an image forming technique of suppressing an image error and implementing high image quality by performing tone correction in accordance with the type of recommended sheet for use.

The present invention can provide a storage medium available to correct image forming conditions in an image forming apparatus.

Further features of the present invention will become apparent from the following description of exemplary embodiments with reference to the attached drawings.

BRIEF DESCRIPTION OF THE DRAWINGS

FIG. 3 is a view showing an example of the structure of a 1D symbol reader according to the embodiment;

FIG. 4 is a view showing an example (interleaved 2 of 5) of a 1D symbol according to the embodiment;

FIGS. 5A and 5B are views showing an example of the structure of a color sensor according to the embodiment;

FIG. 15 is a table showing the relationship between the type of calibration-specific sheet and the target luminance value;

FIG. 18 is a view showing a schematic model for the calibration-specific sheet and color material;

FIG. 19 is a graph showing the relationship between the calibration-specific sheet and the spectral characteristic of toner;

FIG. 20B is a table showing a lookup table (LUT) showing the relationship between the grammage and the grammage coefficient G;

FIG. 22 is a table illustrating part of cyan calibration information recorded in the 2D symbol;

DESCRIPTION OF THE EMBODIMENTS

Preferred embodiments of the present invention will be described in detail below with reference to the accompanying drawings.

First Embodiment

An image forming apparatus according to the first embodiment performs automatic tone correction using a recommended sheet ("calibration-specific sheet") to prevent a fixing offset, degradation of the image quality, and the like which occur when using sheets other than the calibration-specific sheet.

An arrangement which executes automatic tone correction using the calibration-specific sheet is implemented by printing in advance a 1D symbol capable of identifying a calibration-specific sheet, and detecting the 1D symbol by the image forming apparatus. Identification of the calibration-specific sheet is achieved not only by detecting the 1D symbol, but also by using a 2D symbol (to be described later) or the like.

The feature of tone correction in the image forming apparatus is based on the fact that the same problem arises in a printer of the electrophotographic method, an inkjet printer, and the like. This problem can be solved by applying the following arrangement. An electrophotographic image forming apparatus will be explained as an example of the image forming apparatus. However, the gist of the present invention is not limited to the electrophotographic image forming apparatus, and is also applicable to an inkjet printer and the like.

(Description of Image Forming Apparatus)

Figure 1:
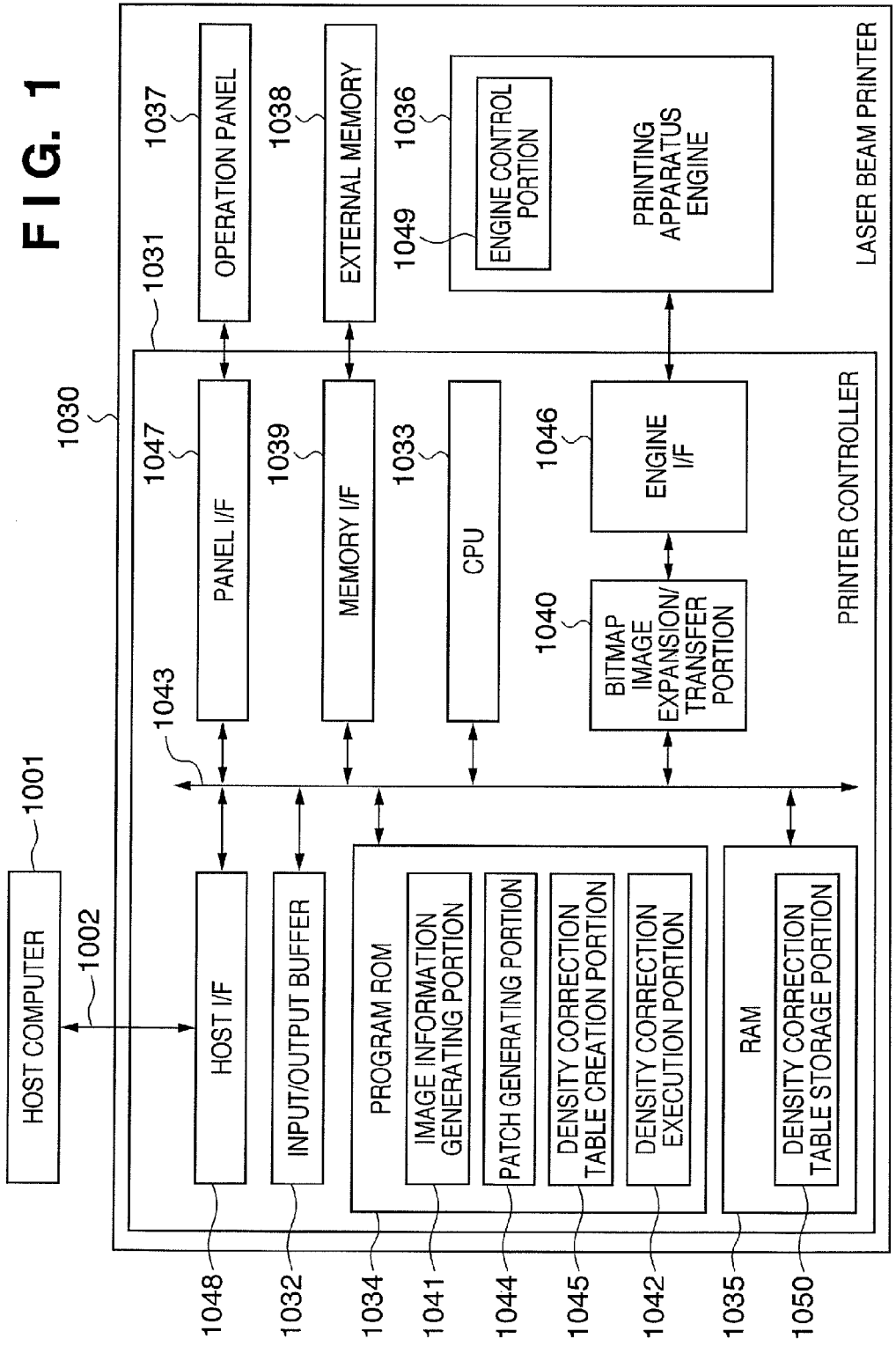
FIG. 1 is a block diagram showing the configuration of an image forming system according to an embodiment of the present invention.

FIG. 1 is a block diagram showing the configuration of an image forming system according to the embodiment of the present invention. In FIG. 1, a host computer 1001 and a color laser beam printer (to be also referred to as an "image forming apparatus" hereinafter) 1030 connect to each other via a communication line 1002.

In the image forming apparatus 1030, a printer controller 1031 manages the whole operation of the printer. A host I/F 1048 in the printer controller 1031 manages input/output to/from the host computer 1001.

An input/output buffer 1032 transmits/receives control codes via the host I/F 1048 and data to/from each communication portion. A CPU 1033 controls the whole operation of the printer controller 1031.

A program ROM 1034 can store control programs and control data executed by the CPU 1033. The program ROM 1034 incorporates, as program modules, an image information generating portion 1041, patch generating portion 1044, density correction table creation portion 1045, and density correction execution portion 1042. These program modules can control conversion of luminance information and density information and generation of a patch image and the like when executing tone correction (to be described later) in cooperation with the CPU 1033.

The image information generating portion 1041 can generate various image objects in accordance with data settings received from the host computer 1001. The patch generating portion 1044 can generate a patch image for use when measuring density in density correction. The density correction table creation portion 1045 can create a density correction table on the basis of the density measurement result. The density correction execution portion 1042 can perform density correction on the basis of the result of measuring the patch density.

A RAM 1035 is available as a work memory for interpretation of control codes and data, calculation necessary for printing, or print data processing. The RAM 1035 can store a density correction table storage portion 1050 for storing a correction table.

A bitmap image expansion/transfer portion 1040 in the printer controller 1031 can expand an image object into a bitmap image, and transfer the expanded bitmap image to a printing apparatus engine 1036.

The printing apparatus engine 1036 incorporates an engine control portion 1049, and can actually print on a sheet on the basis of a bitmap image expanded by the bitmap image expansion/transfer portion 1040. The engine control portion 1049 can control each print processing (e.g., sheet feed processing) by each mechanism.

The printing apparatus engine 1036 and printer controller 1031 connect to each other via an engine I/F 1046.

The user can operate the printing apparatus via an operation panel 1037. The printer controller 1031 and operation panel 1037 connect to each other via a panel I/F 1047.

An external memory 1038 can save print data and various types of information on the printing apparatus. The printer controller 1031 and external memory 1038 connect to each other via a memory I/F 1039. Portions in the printer controller 1031 are connected to a system bus 1043.

The structure and operation of the image forming apparatus 1030 will be described.

(Structure of Image Forming Apparatus 1030)

Figure 2:
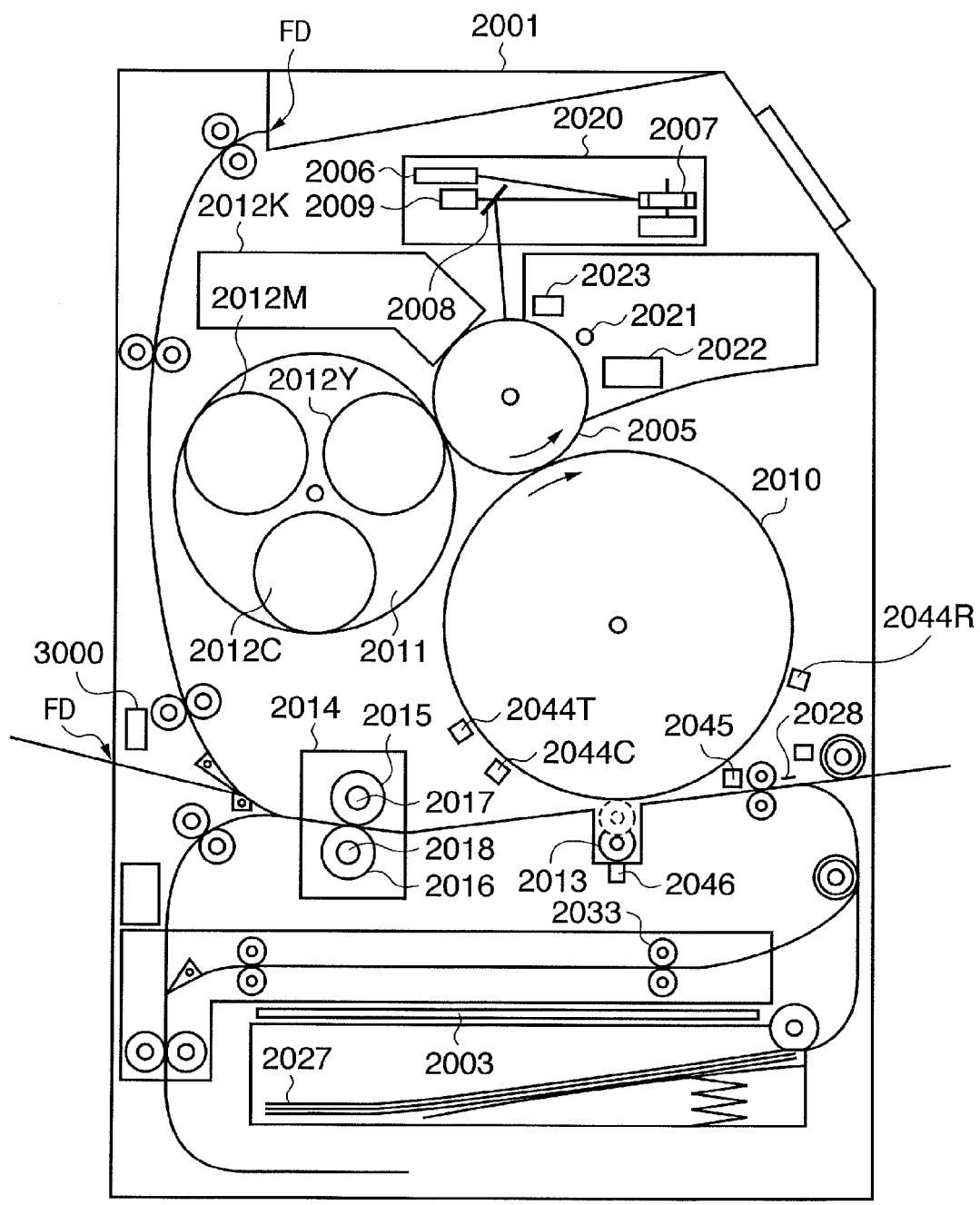
FIG. 2 is a sectional view showing the structure of an image forming apparatus 1030 according to the embodiment.

FIG. 2 is a sectional view showing the structure of the image forming apparatus 1030 in the embodiment. A housing 2001 of the image forming apparatus 1030 incorporates mechanisms which build the printing apparatus engine 1036. The housing 2001 incorporates a control board container 2003 which contains the engine control portion 1049 and printer controller 1031 for performing control associated with each print processing by each mechanism.

Mechanisms which build the printing apparatus engine 1036 include an optical processing mechanism, a fixing processing mechanism which fixes a toner image transferred on a transfer material 2027, a sheet feed processing mechanism which feeds the transfer material 2027, and a convey processing mechanism which conveys the transfer material 2027.

(Optical Processing Mechanism)

The optical processing mechanism can form an electrostatic latent image on a photosensitive drum 2005 by scanning a laser beam, visualize the electrostatic latent image, transfer multiple visible images onto an intermediate transfer member 2010, and transfer the multiple transferred color images onto the transfer material 2027.

A laser scanner section 2020 has a laser driver 2006 which ON/OFF-drives a laser beam emitted from a semiconductor laser (not shown) in accordance with image data supplied from the printer controller 1031. A rotary polygon mirror 2007 oscillates the laser beam emitted from the semiconductor laser in the scanning direction. The laser beam oscillated in the main scanning direction is guided to the photosensitive drum 2005 via a reflecting mirror 2008 to expose the photosensitive drum 2005 in the main scanning direction. A beam detector 2009 supplies a laser beam detection signal to the control board container 2003.

A primary charger 2023 charges the surface of the photosensitive drum 2005. An electrostatic latent image formed on the photosensitive drum 2005 by scan exposure with a laser beam is visualized into a toner image with toner supplied from a developing portion to be described later. The toner image visualized on the photosensitive drum 2005 is transferred (primary transfer) onto the intermediate transfer member 2010 to which a voltage opposite in polarity to the toner image is applied. In forming a color image, a developing rotary 2011 rotates every rotation of the intermediate transfer member 2010.

The developing step proceeds in the order of a yellow developing portion 2012Y, a magenta developing portion 2012M, a cyan developing portion 2012C, and a black developing portion 2012K. The intermediate transfer member 2010 rotates four times to sequentially form yellow, magenta, cyan, and black visible images on it. As a result, the intermediate transfer member 2010 bears a full-color visible image.

In forming a monochrome image, only the black developing portion 2012K performs the developing step. The intermediate transfer member 2010 rotates once to form a black visible image. The monochrome visible image is formed on the intermediate transfer member 2010.

The transfer material 2027 which waits at a registration shutter 2028 is conveyed and pressed against the intermediate transfer member 2010 by a transfer roller 2013. At the same time as the press contact, the visible image formed on the intermediate transfer member 2010 is transferred onto the transfer material 2027 by applying, to the transfer roller 2013, a bias opposite in polarity to toner (secondary transfer).

The photosensitive drum 2005, yellow developing portion 2012Y, magenta developing portion 2012M, cyan developing portion 2012C, and black developing portion 2012K are detachable. The developing portions except for the black developing portion are housed in the developing rotary 2011. The reflecting mirror 2008 is formed from a semi-transmitting mirror, and the beam detector 2009 is arranged behind the reflecting mirror 2008. The beam detector 2009 detects a laser beam, and inputs the detection signal to the control board container 2003. The engine control portion 1049 in the control board container 2003 generates a horizontal sync signal for determining the exposure timing in the main scanning direction on the basis of the detection signal of the beam detector 2009. The engine control portion 1049 outputs the horizontal sync signal to the printer controller 1031.

A cleaner 2022 cleans toner remaining on the photosensitive drum 2005. A pre-exposure lamp 2021 optically removes charges from the photosensitive drum 2005. The transfer roller 2013 can move up and down in FIG. 2, and has a driving portion. While a toner image is formed on the intermediate transfer member 2010, the transfer roller 2013 stays down and is apart from the intermediate transfer member 2010, as indicated by the solid line in FIG. 2. After the toner image is formed on the intermediate transfer member 2010, a cam member (not shown) presses the transfer roller 2013 against an upper position (intermediate transfer member 2010) indicated by the dotted line in FIG. 2 under a predetermined pressure in synchronism with the timing when transferring a color image onto the transfer material 2027. At the same time, the transfer roller 2013 receives a bias to transfer the toner image on the intermediate transfer member 2010 onto the transfer material 2027.

A transfer roller cleaner 2046 cleans toner remaining on the intermediate transfer member 2010.

An image formation start position detection sensor 2044T for determining the print start position in forming an image, and a sheet feed timing sensor 2044R for adjusting the sheet feed timing of the transfer material 2027 are arranged near the intermediate transfer member 2010.

A density sensor 2044C for measuring the density of a patch in density control is also arranged near the intermediate transfer member 2010. When density control is done, the density sensor 2044C measures the density of each patch.

(Fixing Processing Mechanism, Sheet Feed Processing Mechanism, and Convey Processing Mechanism)

The fixing processing mechanism comprises a fixing portion 2014 which heats, presses, and fixes a toner image transferred on the transfer material 2027. The fixing portion 2014 includes a fixing roller 2015 for applying heat to the transfer material 2027, and a press roller 2016 for pressing the fixing roller 2015 against the transfer material 2027. These rollers are hollow, and incorporate heaters 2017 and 2018, respectively. Simultaneously when the rollers are driven to rotate, the transfer material 2027 is conveyed.

A transfer material determination sensor 2045 can automatically detect the type of transfer material 2027. The detection result of the transfer material determination sensor 2045 is used for convey control of the transfer material 2027. For example, the convey speed of the transfer material 2027 is increased or decreased to apply the amount of heat corresponding to the characteristic of the transfer material 2027. This can adjust the timing when the transfer material 2027 passes through the fixing portion 2014. The fixing portion 2014 is followed by a color sensor 3000 which detects a patch image on the transfer material 2027. A 1D symbol reader (not shown) which determines whether the conveyed sheet is a calibration-specific sheet is arranged on the far side from the color sensor 3000 on the sheet surface of FIG. 2.

As long as the color sensor 3000 has a precision to read a barcode, the color sensor 3000 may replace the 1D symbol reader to read the 1D symbol and determine whether the conveyed sheet is a calibration-specific sheet.

(1D Symbol Reader)

FIG. 3 is a view showing an example of the structure of a 1D symbol reader 4000. The 1D symbol reader 4000 reads information from a 1D symbol marked on a calibration-specific sheet 5000.

The 1D symbol reader 4000 comprises an LED (white LED) serving as a light projecting portion (light source), and a light receiving element PD (Photo Diode) serving as a light receiving portion which receives reflected light of light emitted from the LED. The white LED serving as the light source irradiates a 1D symbol marked on the calibration-specific sheet 5000 obliquely from above at an angle of about 45°. The light receiving element PD receives light diffused and reflected by the 1D symbol at an angle of about 90° to the calibration-specific sheet 5000.

The positional relationship between the light projecting portion and the light receiving element is not limited to the one shown in FIG. 3, and is changeable.

(Example of 1D Symbol)

FIG. 4 is a view illustrating the array of a typical 1D symbol "interleaved 2 of 5". As shown in FIG. 4, the "interleaved 2 of 5" array is formed from quiet zones, a start pattern, data characters, and a stop pattern. To read information recorded in this array, the 1D symbol reader 4000 requires a resolution of, e.g., about 100 dpi. To increase the resolution of the 1D symbol reader 4000, a lens can also be effectively inserted in the optical path to condense light from the light source and condense diffused light.

In forming a 1D symbol, the x and y sizes are also changeable. For example, the y size is increased from a general 1D symbol size to read a 1D symbol at high precision without any lens. Information of the 1D symbol read by the light receiving element PD is converted into binary information via an A/D converter (not shown).

The first embodiment has exemplified the 1D symbol "interleaved 2 of 5", but the 1D symbol is not limited to this. For example, the present invention is also applicable to a 1D symbol such as "Code39", "Code128", "Coder Bar", "EAN/UPC", or "RSS".

In the 1D symbol reader 4000, the LED is a white LED. However, the LED need not be a white LED in consideration of the background color of the calibration-specific sheet and the print color of the 1D symbol. An image forming apparatus 1030 using a subtractive process uses magenta, cyan, and yellow color materials in addition to a black color material. If the 1D symbol also uses these color materials, red light is desirable for cyan, green light is desirable for magenta, and blue light is desirable for yellow. That is, a light source of a complementary color is desirably selected. This relationship may be satisfied not by the light source but by the filter. For example, the light source uses white light, and a filter of a complementary color is selected.

(Structure of Color Sensor 3000)

FIG. 5A is a view showing an example of the structure of the color sensor 3000. In the color sensor 3000, the light projecting portion has a white LED (light emitting element) 53. A light receiving portion 54a has an RGB on-chip filter-attached charge storage sensor (light receiving element) and a photodiode (PD) used for a trigger signal.

The white LED 53 can irradiate the transfer material 2027 bearing a fixed patch image 58 with light from above at an angle of about 45°. The RGB on-chip filter-attached charge storage sensor 54a detects the intensity of diffused light reflected at an angle of about 90°.

As shown FIG. 5B, the RGB on-chip filter-attached charge storage sensor 54a is formed from independent R, G, and B pixels, as represented by 54b shown in FIG. 5B. The charge storage sensor 54a may be formed from, e.g., a photodiode or from several sets of three, R, G, and B pixels arranged side by side.

The positional relationship between the light projecting portion and the light receiving portion is not limited to the arrangement shown in FIG. 5A. For example, the positional relationship between the light emitting element 53 and the light receiving portion 54a is changeable.

The color sensor 3000 may be formed from an LED which individually emits R, G, and B beams, and a filterless sensor. The color sensor 3000 can detect the R, G, and B output values of a patch image (e.g., the luminance values of a patch image) on a transfer material, and output the detection results to the printer controller 1031 to execute various image control operations.

(Calibration-Specific Sheet with 1D Symbol)

Figure 6:
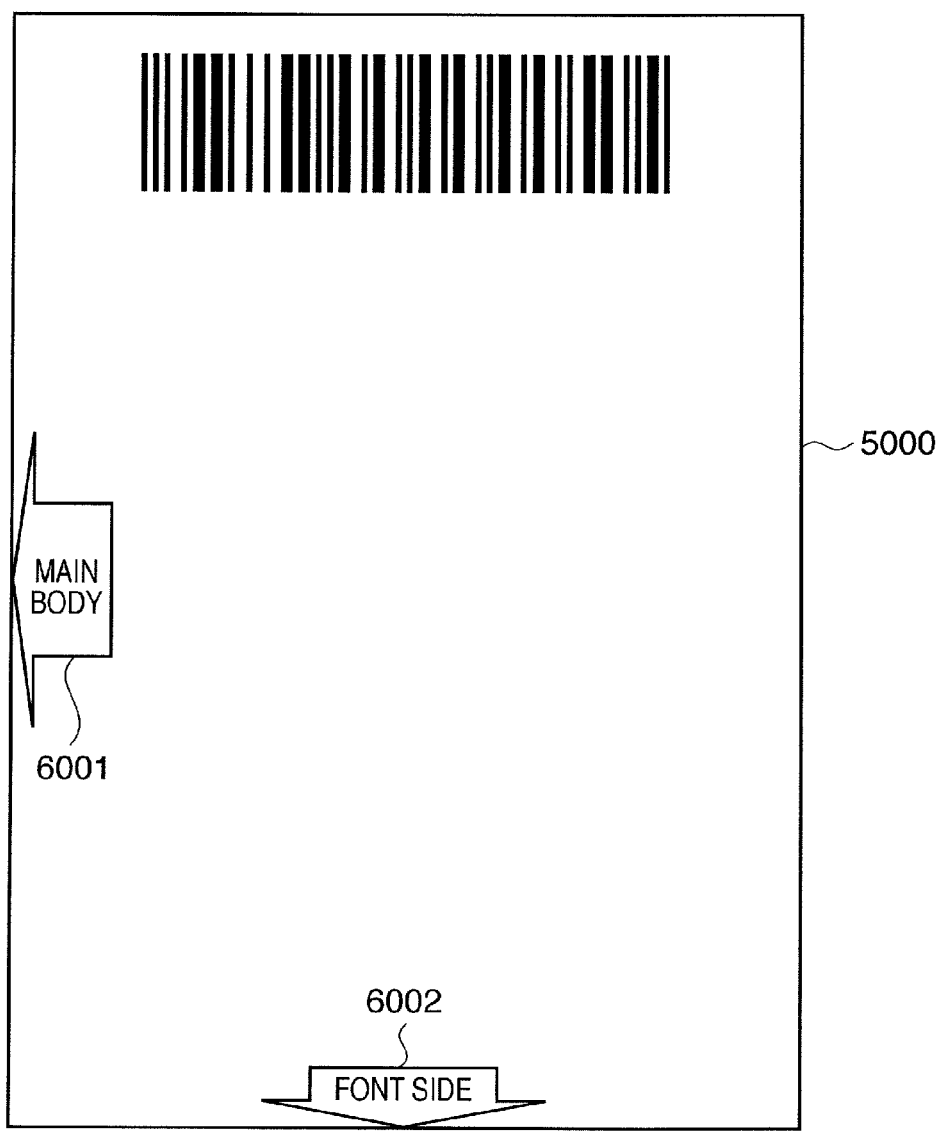
FIG. 6 is a view illustrating a calibration-specific sheet.

FIG. 6 is a view illustrating the calibration-specific sheet 5000. The calibration-specific sheet 5000 records 11-digit information (calibration information) available for calibration of the image forming apparatus 1030. Information recorded as a 1D symbol contains the type of calibration-specific sheet (one digit of 0 to 9), the manufacturing factory number (two digits of 0 to 9), and the lot number (six digits of 0 to 9). Further, the recorded information can contain brightness information (two digits of 0 to 9 (e.g., "99" means 129% and "00" means 30%)).

When preparing the calibration-specific sheet 5000, information of the 11 digits is specified to generate calibration information reflecting the specified information.

The 1D symbol can be generated by software processing by inputting calibration information. The generated 1D symbol (11 digits) is printed by an offset press on a corresponding calibration-specific sheet. At this time, for example, brightness (reflectance of 457-nmλ irradiation light) for each lot of calibration-specific sheets is preferably recorded as brightness information.

When preparing the calibration-specific sheet 5000, pieces of sheet feed guide information 6001 and 6002 can also be added, which explicitly indicate the relationship between the image forming apparatus 1030 and the calibration-specific sheet 5000 to the user. By referring to the pieces of sheet feed guide information 6001 and 6002, the user can set the calibration-specific sheet 5000 at the manual feeder without mistaking the position where the 1D symbol is marked.

Figure 7:
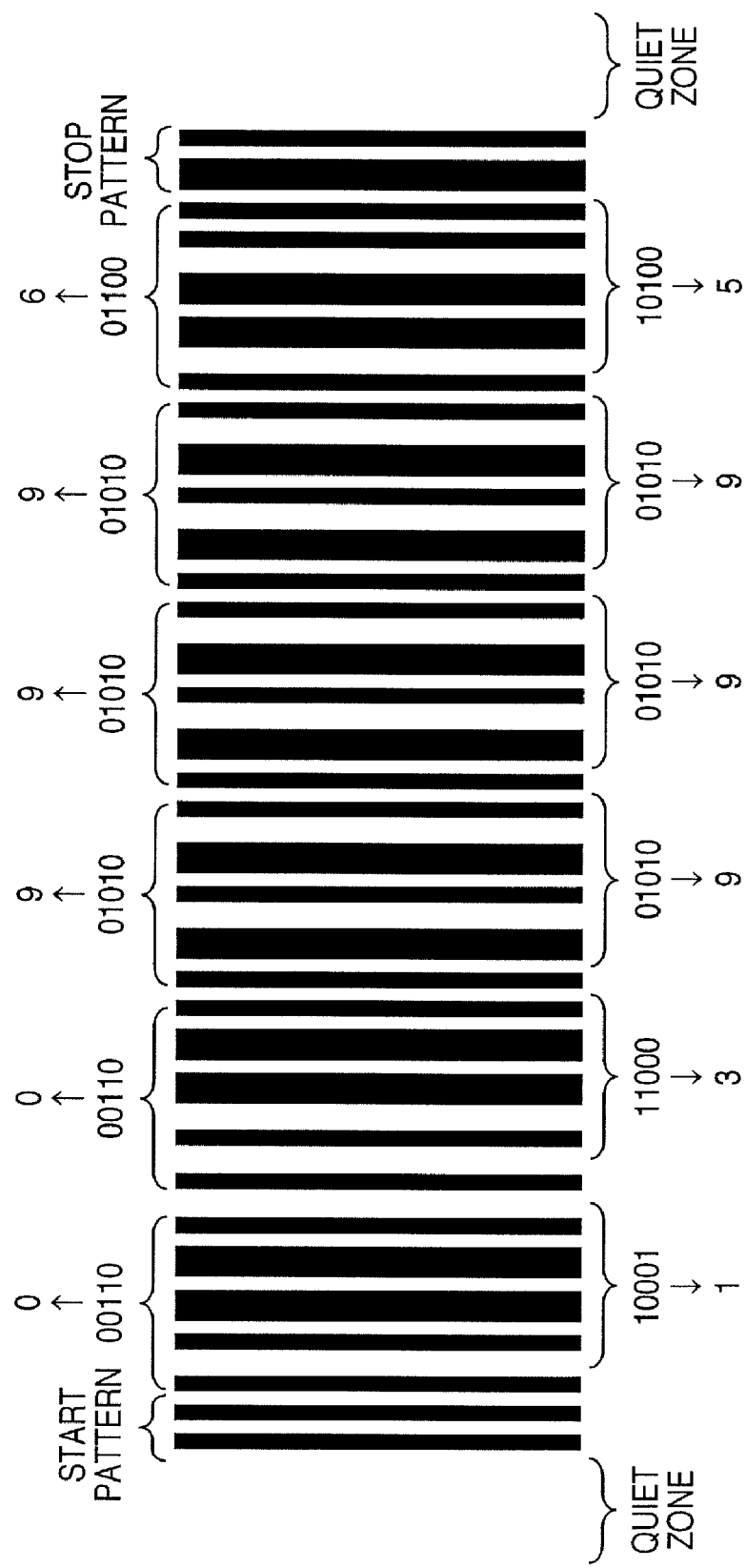
FIG. 7 is a view showing a concrete example of the 1D symbol marked on the calibration-specific sheet.

FIG. 7 shows a concrete example of the 1D symbol marked on the calibration-specific sheet 5000. The 1D symbol marked on the calibration-specific sheet 5000 is formed from quiet zones at the two ends, a start pattern, data characters, and a stop pattern. The data characters record information on the type of calibration-specific sheet and the like. For "interleaved 2 of 5", a thin line represents "0", and a thick line represents "1". The data character is changed into a digital value using the following conversion table.

| Code | Character String |
|---|---|
| 0 → | 00110 |
| 1 → | 10001 |
| 2 → | 01001 |
| 3 → | 11000 |
| 4 → | 00101 |
| 5 → | 10100 |
| 6 → | 01100 |
| 7 → | 00011 |
| 8 → | 10010 |
| 9 → | 01010 |

In order to process black and white lines as different pieces of numerical information, "0" is attached to the head to adjust the number of digits when the number of digits is odd. Since the number of digits of the 1D symbol on the calibration-specific sheet according to the first embodiment is 11, "0" is attached to the head to adjust the number of digits and represent calibration information of "12 digits". FIG. 7 shows a 1D symbol formed from a sequence "0/1/03/999999/65". The number of digits is adjustable in accordance with generated calibration information.

Under the control of the CPU 1033, the image forming apparatus 1030 can interpret calibration information of the calibration-specific sheet on the basis of the conversion table (conversion rule) of the 1D symbol (interleaved 2 of 5).

In this case, the image forming apparatus 1030 can interpret calibration information to represent that the calibration-specific sheet type at the second digit from the left is "1", the manufacturing factory number is "03", the lot number is "999999", and the brightness is "65 (indicating 95% in this case)".

(Image Control)

Figure 14A:
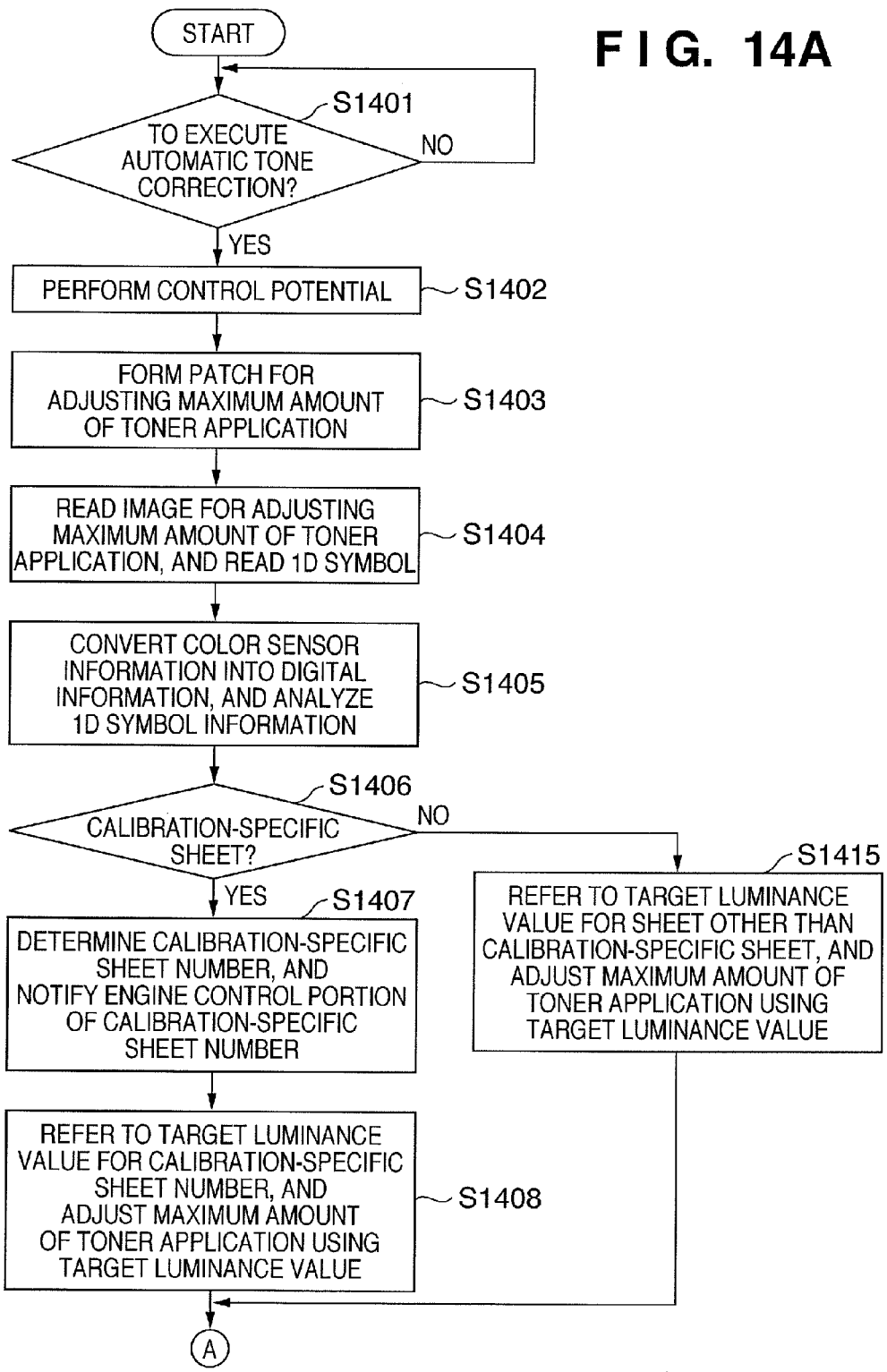
FIGS. 14A and 14B are flowcharts for explaining an image control sequence according to the first embodiment.
Figure 14B:
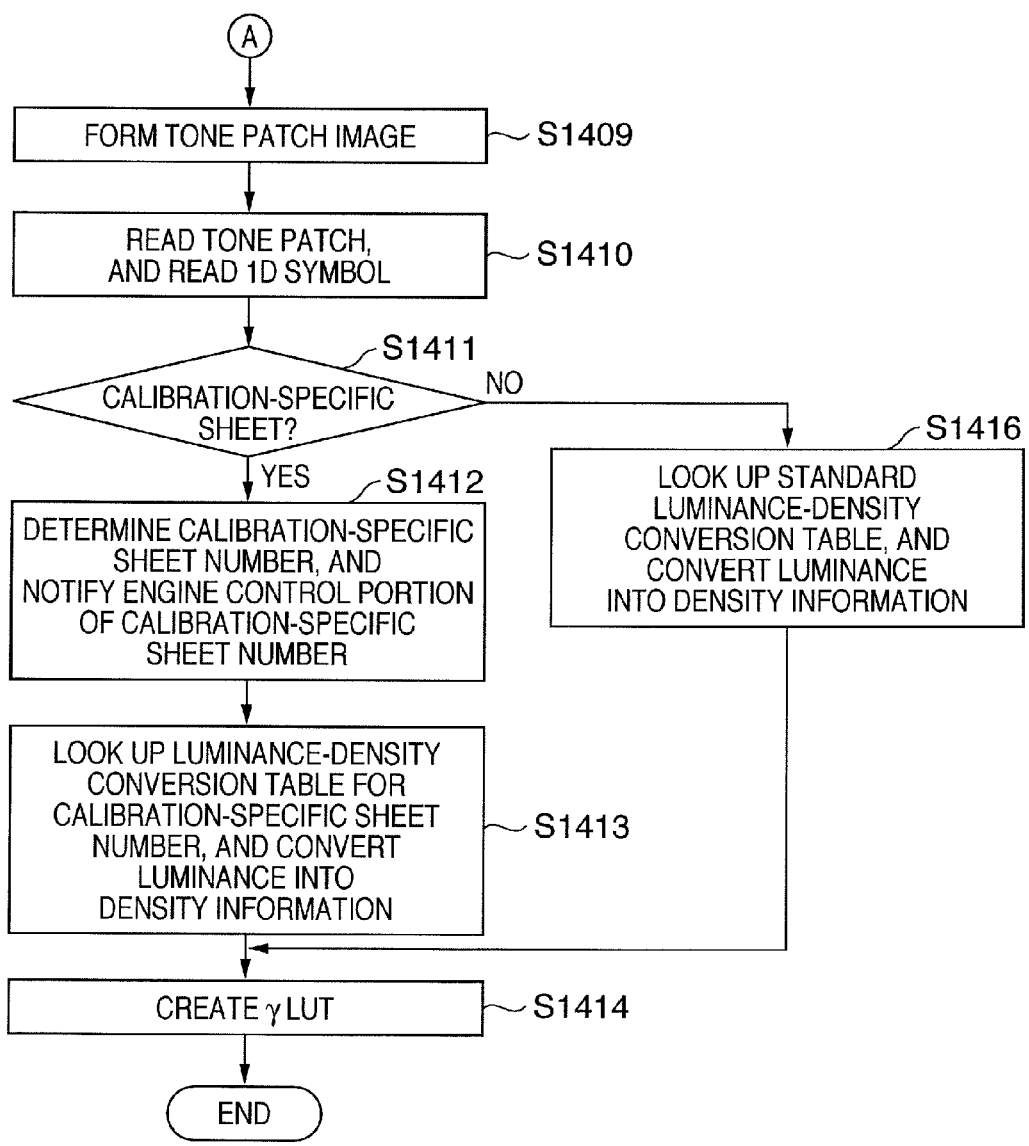

Image control using the 1D symbol reader, the color sensor, and the 1D symbol-marked calibration-specific sheet 5000 will be explained. FIGS. 14A and 14B are flowcharts for explaining an image control sequence according to the first embodiment.

In step S1401, an instruction to execute automatic tone correction is input (YES in S1401), and the process shifts to potential control processing. The user can execute this processing by pressing an automatic tone correction button at an arbitrary timing. As an initial setting, the calibration-specific sheet 5000 used for automatic tone correction is fed from the manual feeder. The user can set the calibration-specific sheet 5000 at the manual feeder while confirming the 1D symbol-marked surface and the feed direction of the calibration-specific sheet by referring to the pieces of sheet feed guide information 6001 and 6002.

The calibration-specific sheet 5000 is fed not only from the manual feeder but also from the sheet feed cassette.

(Potential Control)

In step S1402, potential control processing starts. The engine control portion 1049 determines a target charge potential VdT, grid bias Y, and developing bias Vdc by potential control before printing on a sheet. The potential control processing allows the engine control portion 1049 to determine a charge potential and the like corresponding to the conditions (including temperature and humidity conditions) of the environment where the image forming apparatus 1030 is installed.

Figure 8:
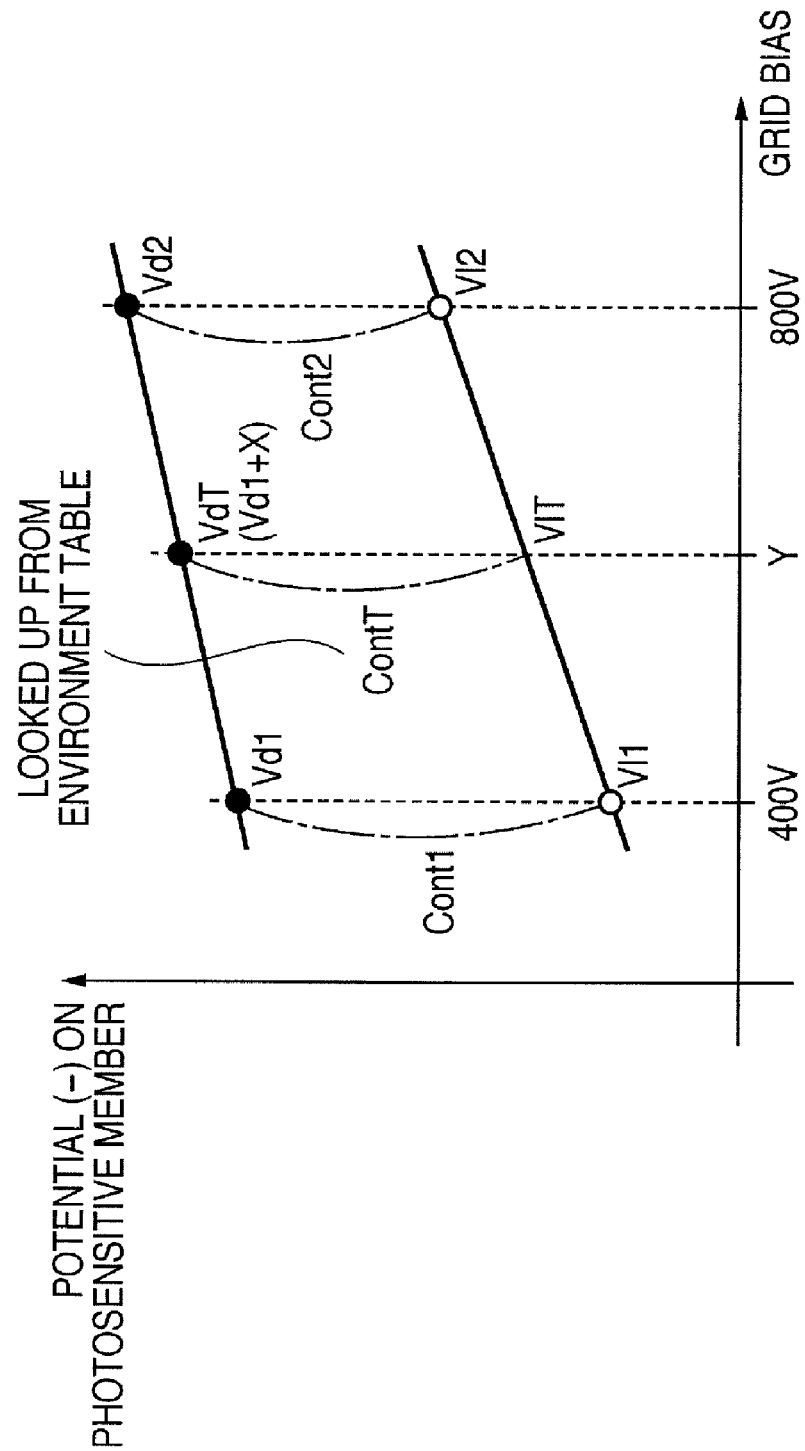
FIG. 8 is a graph for explaining the concept of potential control by two-point potential control according to the embodiment.

In the first embodiment, the engine control portion 1049 executes potential control called two-point potential control. FIG. 8 is a graph for explaining the concept of potential control at two points. In FIG. 8, the charge potential Vd1 is generated under the first charging condition (grid bias of 400 V), and the exposure portion potential Vl1 is a potential generated at standard laser power. The charge potential Vd2 is generated under the second charging condition (grid bias of 800 V), and the exposure portion potential Vl2 is a potential generated at standard laser power at that time. The contrast potentials Cont1 and Cont2 at grid biases of 400 V and 800 V are given by $$Cont1 = Vd1 - Vl1 \quad (1)$$

$$Cont2 = Vd2 - Vl2 \quad (2)$$

The increase ContΔ of the contrast potential at a charge potential of 1 V can be calculated on the basis of the results of equations (1) and (2):

$$ContΔ = (Cont2 - Cont1)/(Vd2 - Vd1) \quad (3)$$

The image forming apparatus 1030 incorporates an environmental sensor (not shown), which measures environmental conditions such as the temperature and humidity in the image forming apparatus 1030. The engine control portion 1049 obtains environmental conditions (e.g., absolute moisture content) in the image forming apparatus 1030 on the basis of the measurement result of the environmental sensor. The engine control portion 1049 refers to a target contrast potential ContT corresponding to the environmental conditions from an environment table registered in advance.

The relationship between the target contrast potential ContT and the target contrast increase ContΔ is given by $$ContT = Cont1 + X \cdot ContΔ \quad (4)$$

By calculating the parameter "X" which satisfies equation (4), the target charge potential VdT (to be also referred to as a "target potential" hereinafter) is given by $$VdT = Vd1 + X \quad (5)$$

The charge potential change amount VdΔ per 1-V grid bias is given by $$VdΔ = (Vd2 - Vd1)/(800 - 400) \quad (6)$$

The grid bias Y which provides the target potential VdT is given by $$Target\ VdT = 400 + Y \cdot VdΔ \quad (7)$$

In equation (7), the charge potential change amount VdΔ can be calculated from equation (6), and the charge potential VdT can be calculated from equation (5). Hence, the grid bias Y which meets equation (7) can be finally determined by substituting known potentials into equations (5) and (6).

By the above process, the target potential VdT and grid bias Y corresponding to environmental conditions can be determined. The developing bias Vdc has a specified potential difference from the target potential VdT, and can be calculated by subtracting a specified potential from the determined target potential VdT.

At the determined developing bias Vdc, subsequent image formation proceeds. The potential on each drum is negative, but the negative sign is omitted here for easy understanding of the calculation process.

By the above process, potential control processing in step S1402 of FIG. 14A ends.

(Formation of Patch Image)

The process advances to step S1403 to form a patch image for adjusting the maximum amount of toner application using the grid bias Y and developing bias Vdc which are determined by potential control in the preceding step S1402.

For a productivity-oriented printer, there is also disclosed a sequence which omits the following sequent and adjusts the maximum amount of toner application by only potential control. However, the precision is poor because only potential control cannot prevent a change of the color material charge holding amount in the developing portion, the mixture ratio of toner and carrier, or the like depending on the environment and durability. Thus, the first embodiment forms patch images by changing laser power (to be referred to as LPW hereinafter) at several stages, and determines LPW used for normal image formation.

Figure 9:
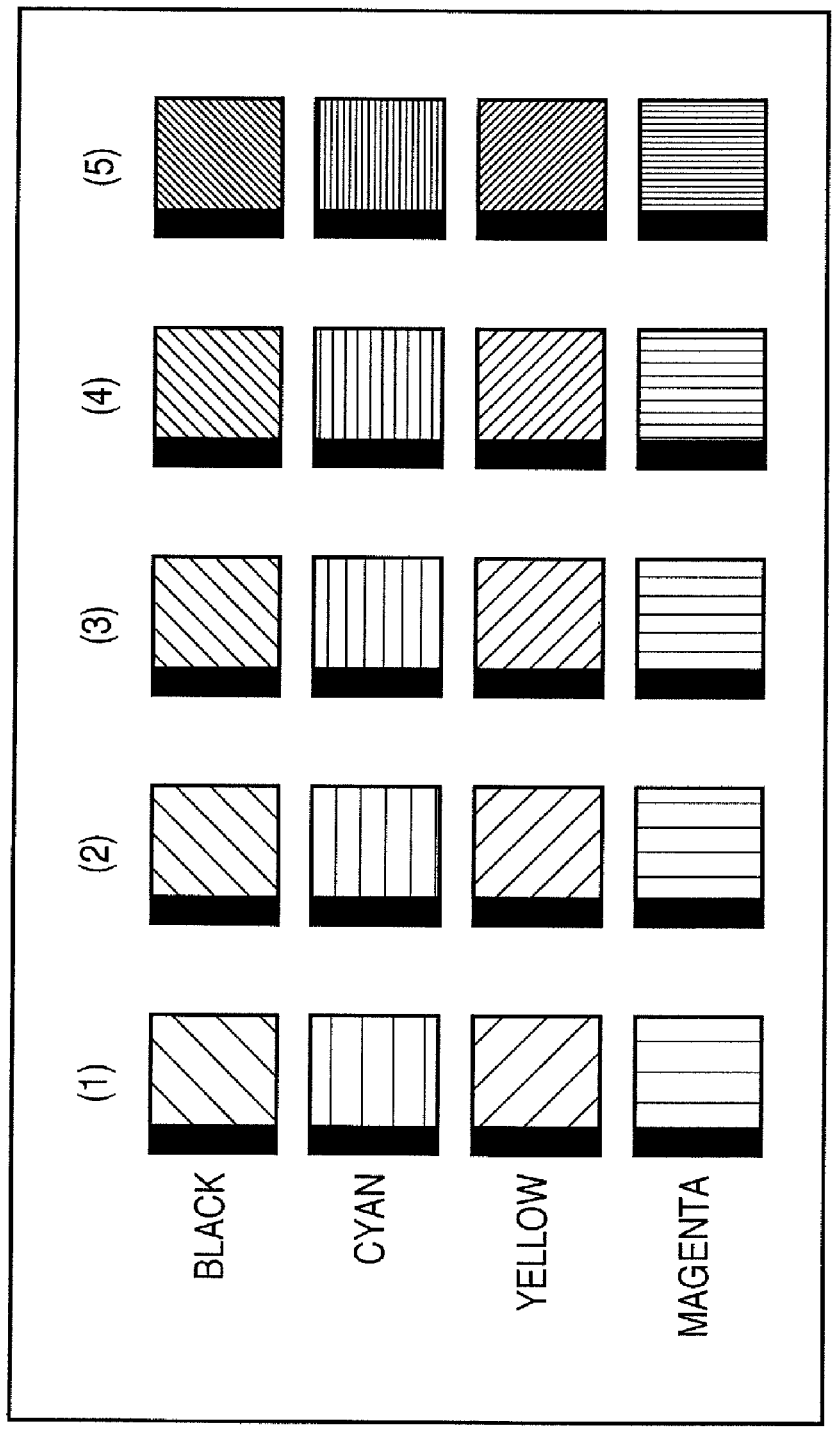
FIG. 9 is a view showing a pattern for adjusting the maximum amount of toner application according to the embodiment.

After determining the grid bias Y and developing bias, the image forming apparatus 1030 forms five patch images (1) to (5) for each of black, cyan, yellow, and magenta, as shown in FIG. 9, in order to adjust the maximum amount of toner application. As the forming condition of the five patch images, LPW changes to LPW1, LPW2, LPW3 (corresponding to standard laser power used for potential control), LPW4, and LPW5 sequentially from the left. The laser power increases sequentially from LPW1 to LPW5.

In step S1404, the color sensor 3000 reads a patch image (image for calibrating the maximum amount of toner application), and the 1D symbol reader 4000 reads a 1D symbol. The 1D symbol is read not only by the 1D symbol reader 4000, but also together with, e.g., the color sensor 3000 which reads a patch image.

The printer controller 1031 receives detection results by the color sensor 3000 and the like, and analyzes them under the control of the CPU 1033. The printer controller 1031 converts patch image information into digital information, and analyzes 1D symbol information as 11-digit calibration information (S1405).

If it is determined in step S1406 that the sheet is the calibration-specific sheet 5000 (YES in S1406), the process advances to step S1407.

In step S1407, the printer controller 1031 determines the type (specified by one digit of 0 to 9) of calibration-specific sheet obtained from the analysis of the 1D symbol. The printer controller 1031 notifies the engine control portion 1049 of the determination result.

The type of calibration-specific sheet is determined, but the presence/absence of the calibration-specific sheet may be determined if there is only one type of calibration-specific sheet. In this case, the calibration-specific sheet has only one predetermined target luminance value (fixed value), as shown in FIG. 15 to be described later.

Also as shown in FIG. 15 to be described later, the target luminance value of the calibration-specific sheet corresponds to each type of calibration-specific sheet. Alternatively, the target luminance value of the calibration-specific sheet may correspond to each type of calibration-specific sheet and its color material.

If it is determined in step S1406 that no 1D symbol is detected, the printer controller 1031 notifies the engine control portion 1049 that the sheet is not the calibration-specific sheet 5000. Then, the process advances to step S1415.

Adjustment of the maximum amount of toner application of the color material in steps S1408 and S1415 will be explained.

(Adjustment of Maximum Amount of Toner Application)

Figure 10:
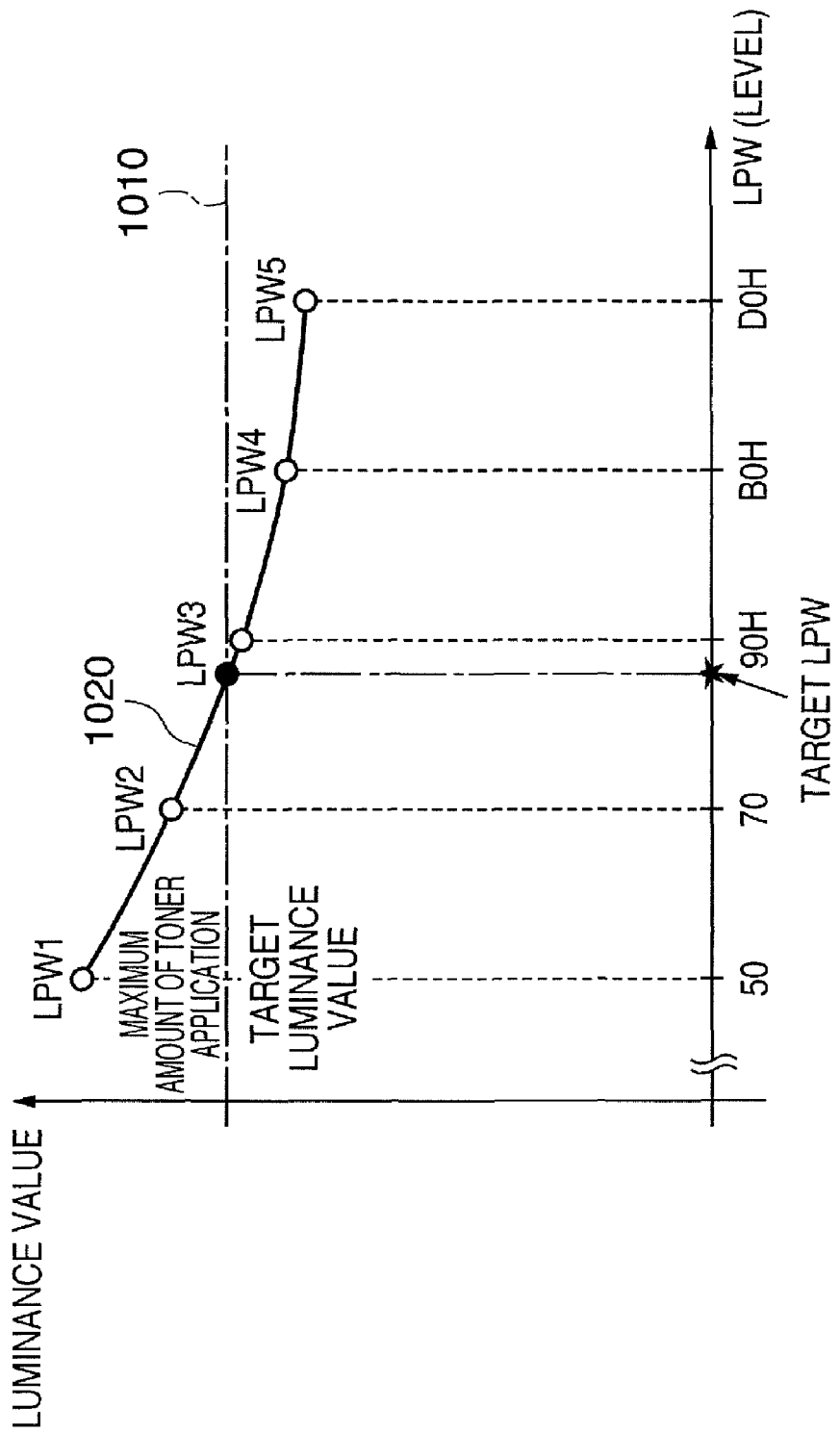
FIG. 10 is a graph showing the relationship between the luminance value of each patch image and LPW.

The color sensor 3000 reads each patch image to obtain the relationship between the luminance value of the patch image and LPW. FIG. 10 is a graph showing the relationship between the luminance value of each patch image and LPW. As LPW increases, the luminance value decreases (FIG. 10).

The decrease in luminance value means an increase in the amount of toner application. The amount of toner application is adjustable by controlling LPW in accordance with a luminance value (to be also referred to as a "target luminance value for the maximum amount of toner application" hereinafter) targeted at a luminance value detected by the color sensor 3000.

In FIG. 10, a chain line 1010 indicates the target luminance value for the maximum amount of toner application. An LPW at the intersection (black circle in FIG. 10) between an LPW distribution curve 1020 and the chain line 1010 is a target LPW which gives a target luminance value for the maximum amount of toner application.

Figure 11:
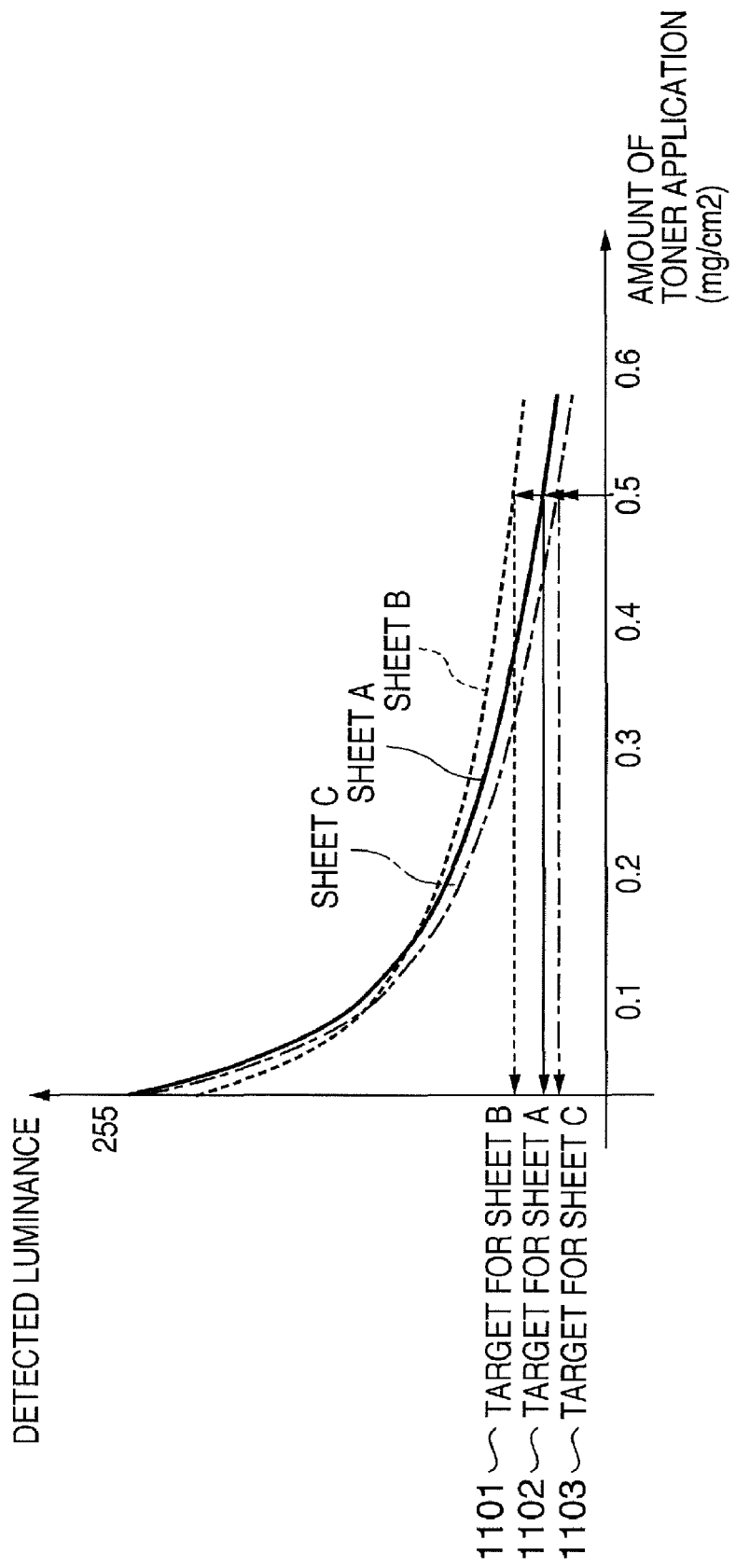
FIG. 11 is a graph showing the relationship between the amount of toner application and a digital value converted from the luminance value of a patch image read by the color sensor.

FIG. 11 is a graph showing the relationship between the amount of toner application and a digital value converted from the luminance value of a patch image read by the color sensor 3000. The target luminance value for the maximum amount of toner application, which implements a toner application amount of 0.5 mg/cm$^2$ for each of three types of calibration-specific sheets (sheets A, B, and C), changes between the calibration-specific sheets (see targets 1101 to 1103).

Since the relationship between the amount of toner application and the read luminance value changes depending on the sheet type, the target luminance value is preferably stored in advance for each type of calibration-specific sheet. FIG. 15 is a table showing the relationship between the type of calibration-specific sheet and the target luminance value. By looking up the table in FIG. 15, a target luminance value corresponding to the type of calibration-specific sheet can be specified. The data storage portion such as the program ROM 1034 can store in advance the relationship between the type of calibration-specific sheet and the target luminance value so that the printer controller 1031 and the like can refer to them.

Referring back to step S1408 in FIG. 14A, the target luminance value is specified from the type of calibration-specific sheet that is notified in step S1407. An LPW which implements this target luminance value is calculated to adjust the maximum amount of toner application.

In step S1415, a target luminance value in a case of not using the calibration-specific sheet 5000 is specified from the table of FIG. 15. An LPW which implements this target luminance value is calculated to adjust the maximum amount of toner application.

A target luminance value (target luminance value "21") in a case of not using the calibration-specific sheet is set larger than that (maximum target luminance value "16") in a case of using the calibration-specific sheet. That is, the maximum amount of toner application in a case of not using the calibration-specific sheet 5000 is controlled to be smaller than that in a case of using the calibration-specific sheet 5000.

If the color material (e.g., toner) exceeds an expected amount in transfer or fixing, an image error such as an unfixed image or scattering of the color material is highly likely to occur. To prevent such an image error, the amount of toner application is reduced by changing the target luminance value in a case of not using the calibration-specific sheet 5000.

The above process can set an LPW which implements the amount of toner application corresponding to the type of calibration-specific sheet 5000 or the amount of toner application in a case of not using the calibration-specific sheet 5000.

(Tone Correction)

The process advances to step S1409 in FIG. 14B to form a tone patch image (tone calibration image). The printer controller 1031 forms single-color patch images (tone patch images) at 10 tone levels at LPW set in step S1408 or S1415. The printer controller 1031 controls the image forming portion to perform halftoning processing (also called screen processing) and output the resultant image.

In step S1410, the color sensor 3000 reads a tone patch image, and the 1D symbol reader 4000 reads a 1D symbol. The 1D symbol is read not only by the 1D symbol reader 4000, but also together with, e.g., the color sensor 3000 which reads a tone patch image.

The printer controller 1031 receives detection results by the color sensor 3000 and the like, and analyzes them under the control of the CPU 1033. The printer controller 1031 converts tone patch image information into digital information, and analyzes 1D symbol information as 11-digit calibration information (S1410).

Since the maximum amount of toner application is adjusted in step S1408 or S1415, the background detection value is normalized to 0, and the maximum luminance detection value (corresponding to the target luminance value) is normalized to 255.

If it is determined in step S1411 that the sheet is the calibration-specific sheet 5000 (YES in S1411), the process advances to step S1412.

In step S1412, the printer controller 1031 determines the type (specified by one digit of 0 to 9) of calibration-specific sheet obtained from the analysis of the 1D symbol. The printer controller 1031 notifies the engine control portion 1049 of the determination result.

If it is determined in step S1411 that no 1D symbol is detected, the printer controller 1031 notifies the engine control portion 1049 that the sheet is not the calibration-specific sheet 5000. Then, the process advances to step S1416.

In step S1413 or S1416, the normalized luminance detection value is converted into density information. FIG. 13 is a graph illustrating the relationship between the luminance and density of each calibration-specific sheet. As shown in FIG. 13, the relationship between the luminance and the density changes between sheets A, B, C, and D depending on the sheet type. Hence, the luminance is converted into the density by looking up a luminance-density conversion table (FIGS. 12B and 13) representing the relationship between the luminance and the density that is specified in accordance with the type of calibration-specific sheet 5000.

The luminance-density conversion table representing the relationship between the luminance and the density is described in accordance with the type of calibration-specific sheet 5000. However, the luminance-density conversion table may be based on the relationship between the luminance and density of each color material and the type of calibration-specific sheet 5000.

When there is only one type of calibration-specific sheet, a luminance-density conversion table representing the relationship between the luminance and density specified in advance, or a luminance-density conversion table representing the relationship between the luminance and density of each color material is adopted.

If the sheet is not the calibration-specific sheet (S1416), a luminance normalized by a preset standard curve can be converted into the density. As the standard curve, a pattern different from that for the calibration-specific sheet may be set. It is also possible to set the relationship between the luminance and density of a typical calibration-specific sheet as a standard curve.

The data storage portion such as the program ROM 1034 can store in advance the luminance-density conversion table (FIGS. 12B and 13) for each calibration-specific sheet so that the printer controller 1031 and the like can look them up.

In step S1414, the density correction table creation portion 1045 in the printer controller 1031 generates a density correction table (to be referred to as a "γLUT" hereinafter). The density correction table creation portion 1045 compares input image data before halftoning with a tone patch image to create the density correction table γLUT so that an output image attains a desired density tone.

Figure 12A:
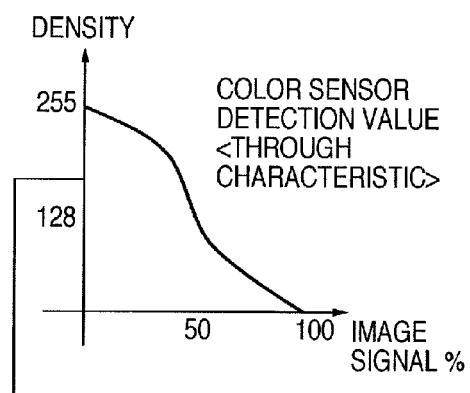
FIGS. 12A, 12B, and 12C are graphs for explaining a tone correction sequence till creation of the γLUT from a detected luminance value.
Figure 12B:
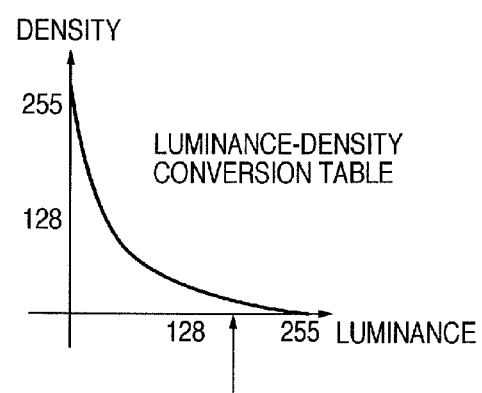
Figure 12C:
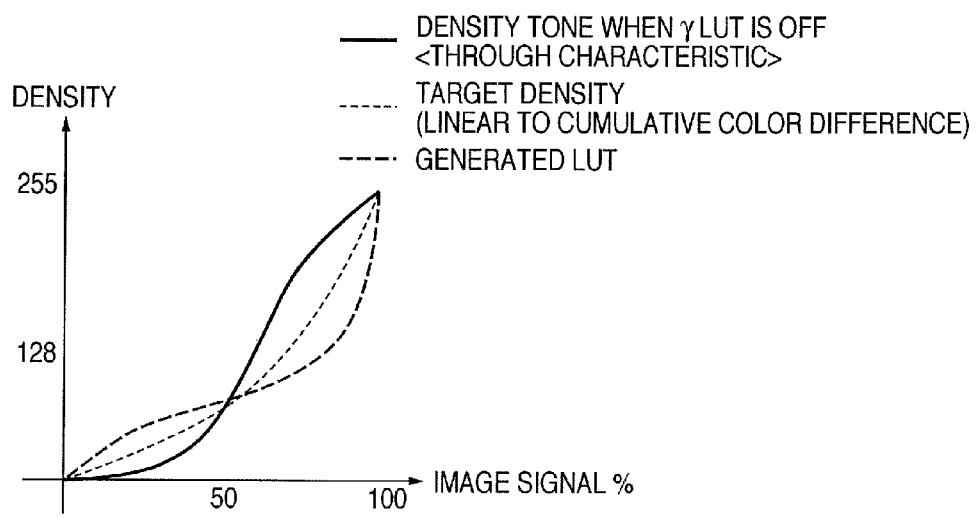
Figure 13:
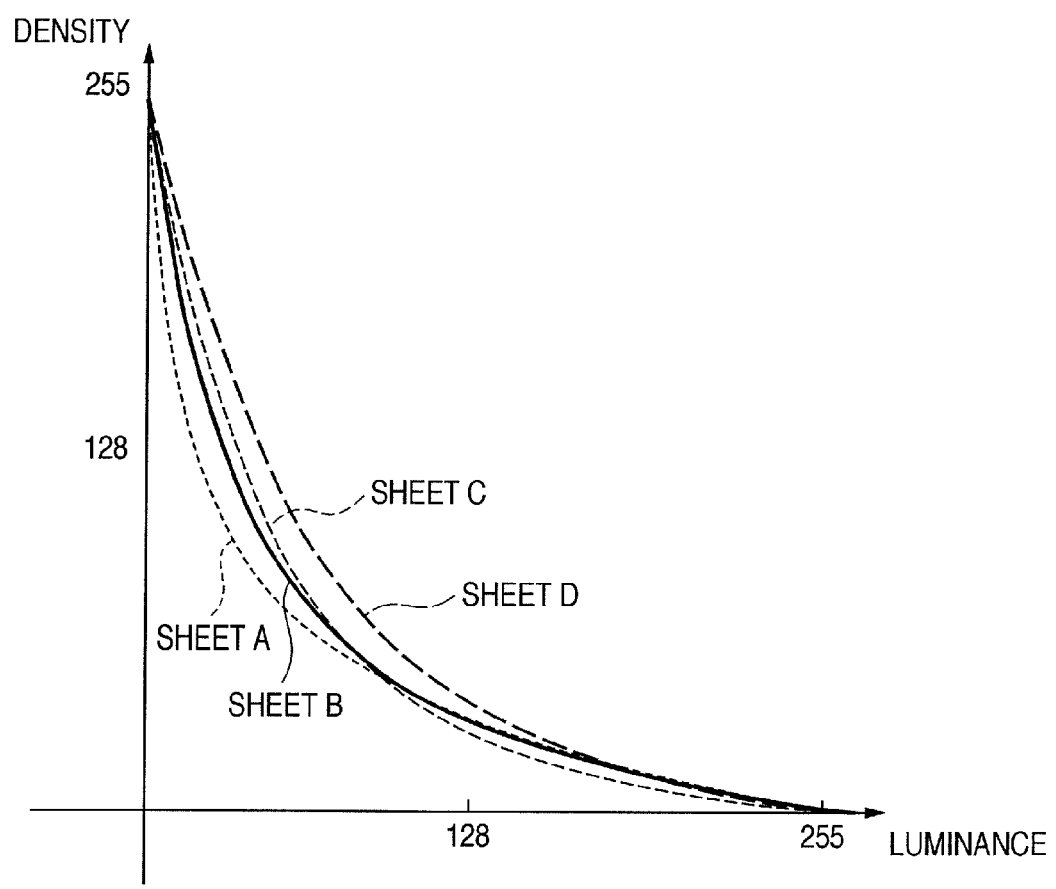
FIG. 13 is a graph illustrating the relationship between the luminance and density of each calibration-specific sheet.

FIGS. 12A, 12B, and 12C are graphs for explaining the process (tone correction sequence) till creation of the γLUT from a detected luminance value.

FIG. 12A is a graph showing the relationship between an image signal and luminance which are detected by the color sensor 3000. The detected luminance (maximum value is normalized to 255) is converted into density information by looking up the luminance-density conversion table shown in FIG. 12B.

The relationship between the image signal and the density is derived from the relationships in FIGS. 12A and 12B, and the γLUT is generated to obtain a desired density tone. For a desired density tone, for example, the γLUT is created to make the tone characteristic of the image forming apparatus linear to the cumulative color difference, as described in Japanese Patent Laid-Open No. 2003-324619.

In the above description, the target maximum amount of toner application is defined by the luminance value. Instead, the density may be calculated using the luminance-density conversion table to define the target maximum amount of toner application by the density.

The γLUT created when the sheet is not the calibration-specific sheet (S1416 and S1414) implements tone correction which decreases the amount of toner application from that in executing automatic tone correction when the calibration-specific sheet is used.

When the sheet is not the calibration-specific sheet, an LPW output of about 10% may be uniformly cut from normal calculation results to execute automatic tone correction. Even in this case, the same effects can be achieved.

As described above, the first embodiment can provide an image forming technique of suppressing an image error and implementing high image quality by performing tone correction corresponding to the type of recommended sheet for use.

Also, the first embodiment can provide a storage medium available to correct image forming conditions in the image forming apparatus.

Modification to First Embodiment

The first embodiment has described the arrangement in which the 1D symbol reader 4000 detects a 1D symbol on a calibration-specific sheet, it is determined whether the sheet is the calibration-specific sheet, and if the sheet is the calibration-specific sheet, calibration conditions are optimized. The arrangement in which a 1D symbol is marked on a calibration-specific sheet and detected by the image forming apparatus is excellent in usability and error prevention but poses a cost problem. For a cost-oriented user and device, the arrangement may be modified to allow a user or serviceman to input the type of calibration-specific sheet from the operation window in the use of wood-free sheets of 64 to 105 g/m² (to be described later) without using the 1D symbol reader 4000 (see FIG. 25).

Figure 25:
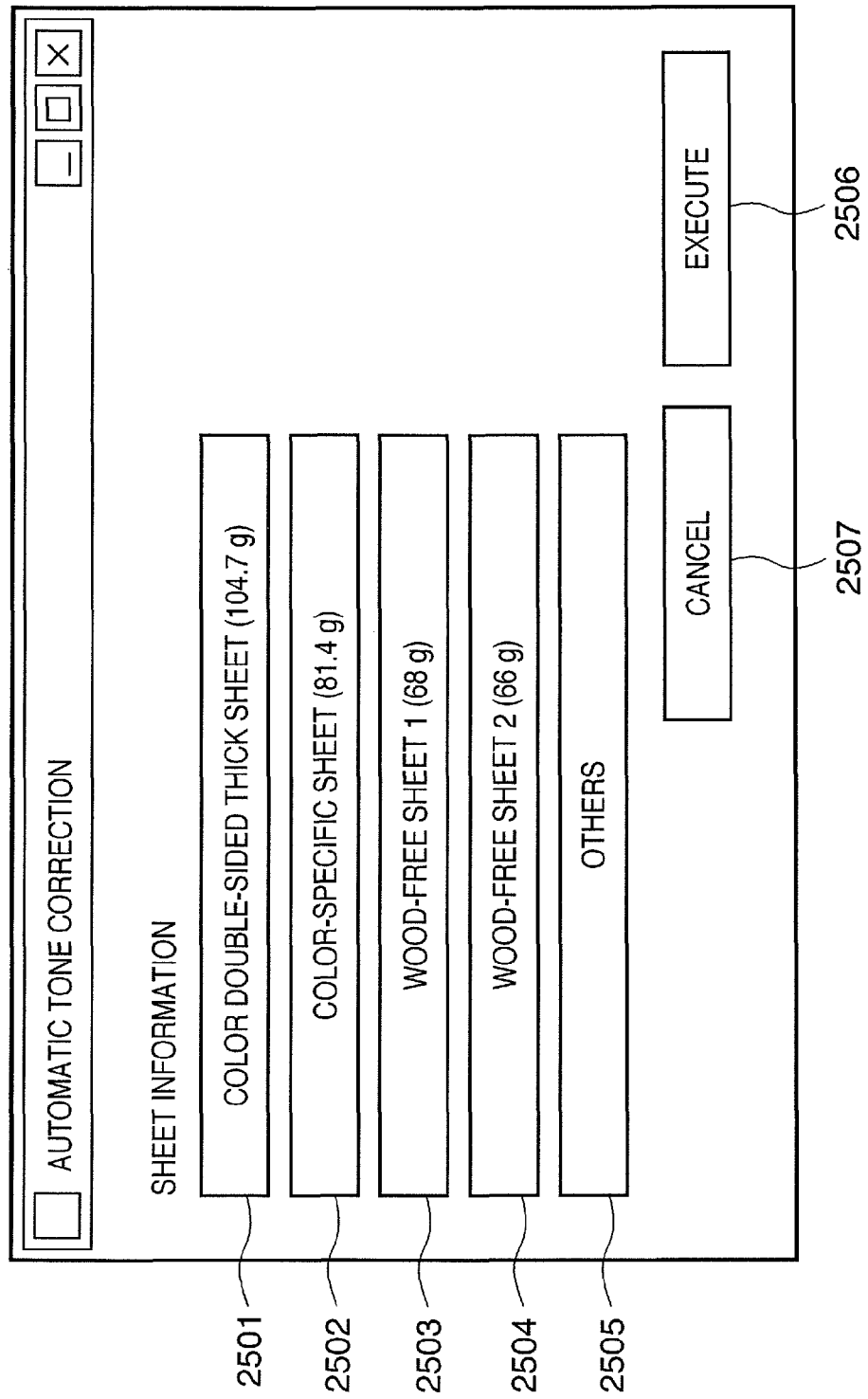
FIG. 25 is a view illustrating an operation window according to a modification to the first embodiment.

FIG. 25 shows an example of sheet types (sheet information) in the use of wood-free sheets of 64 to 105 g/m² (to be described later) for automatic tone correction. The operation window displays a color double-sided thick sheet 2501, color-specific sheet 2502, wood-free sheet 1 2503, and wood-free sheet 2 2504. The user or serviceman can select a corresponding sheet type. For example, when the user or serviceman selects the wood-free sheet 2 2504 and an execution button 2506, it is specified that the sheet type is the wood-free sheet 2 2504. The sheet selection is cleared by selecting a cancel button 2507. For these sheets, the sheet names of print sheets recommended in advance by the apparatus manufacturer for use in the image forming apparatus are registered in correspondence with respective sheet feed cassettes or specific sheet feed cassettes. The user sets print sheets in corresponding sheet feed cassettes. Target luminance values for maximum amounts of toner application corresponding to the respective color double-sided thick sheet 2501, color-specific sheet 2502, wood-free sheet 1 2503, and wood-free sheet 2 2504 are stored in advance as shown in FIG. 15.

The arrangement which specifies, from an input from the operation window, the type of print sheet recommended by the apparatus manufacturer for use in the image forming apparatus, as shown in FIG. 25, can determine whether the sheet is recommended and the type of recommended sheet at low cost. In this case, a target luminance value optimum for adjusting the maximum amount of toner application serving as a calibration condition suffices to be used in accordance with the determined type of recommended sheet, as described above. Also, a luminance-density conversion table optimum for returning tonality serving as a calibration condition to a standard one suffices to be used in accordance with the determined type of recommended sheet.

If "others" 2505 is selected when the sheet is not recommended, image formation is executed at an amount of toner application smaller than the normal one, similar to the arrangement of the first embodiment.

Second Embodiment

The second embodiment of the present invention will be described. The first embodiment determines the type of calibration-specific sheet 5000 and the like by using the 1D symbol. The second embodiment will explain an arrangement using a 2D symbol capable of storing a larger amount of information.

The first embodiment implements adjustment satisfactory for general office application and quick printing application by using a 1D symbol to determine 11-digit information on the type of calibration-specific sheet and the like. In general, however, variations between lots in the paper manufacturer cannot be completely eliminated. To meet needs from the POD and GA (Graphic Arts) markets and the like to adjust the color difference around achromatic color at high precision, high-precision calibration must be executed. The second embodiment will describe a preferable arrangement which calibrates an image forming apparatus 1030 using a 2D symbol of a larger information amount.

(Example of Information Recorded in 2D Symbol)

The spectral reflectance characteristic and grammage of the calibration-specific sheet are recorded as examples of calibration information added to 1D symbol information.

As for the spectral reflectance characteristic, the spectral reflectance of the calibration-specific sheet is recorded from 380 nm to 730 nm at intervals of 10 nm. That is, 36 pieces of spectral reflectance information are added. To record each of the 36 pieces of spectral reflectance information by two digits (two digits of 0 to 9 similar to brightness in the first embodiment), the total spectral reflectance information requires 72 digits.

As for the grammage, 0 to 999 g/m² is described by three digits. The 2D symbol stores spectral reflectance information (72 digits)+grammage (three digits)=75-digit information in addition to calibration information of the 1D symbol.

(Example of 2D Symbol)

An example of the 2D symbol is a QR Code®, and "PDF417", "RSS Composite", "Data Matrix", "MaxiCode", and the like are also available.

Figure 16:
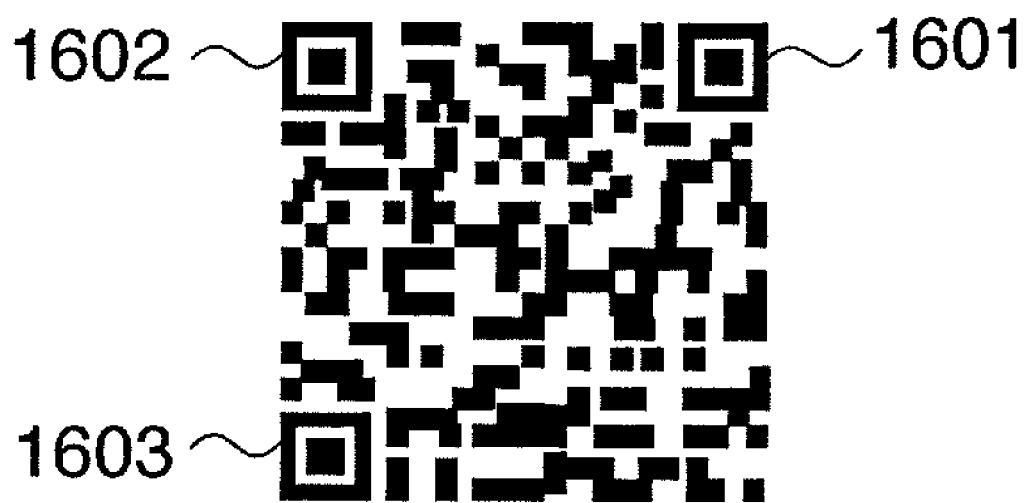
FIG. 16 is a view illustrating a 2D symbol.

FIG. 16 is a view illustrating a 2D symbol of a large-capacity, high-density matrix type capable of processing numerical information of about 7,000 digits. The 2D symbol has finder patterns 1601 to 1603 at three corners and is detectable at any angle of 360°. The 2D symbol can record an alignment pattern for correcting distortion, a timing pattern for correcting coordinates, and binary coded data of 0 and 1, similar to "interleaved 2 of 5".

(2D Symbol Reader)

Figure 17:
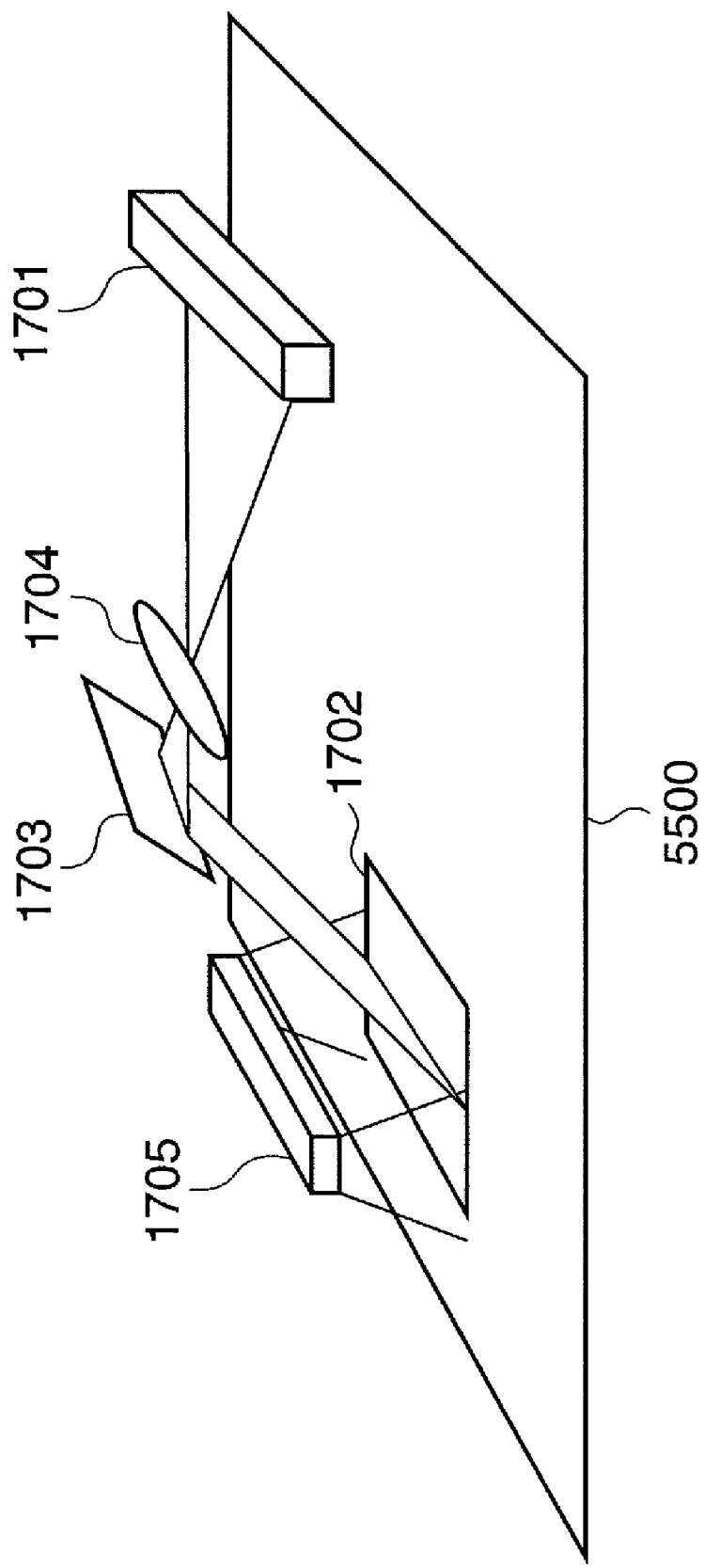
FIG. 17 is a view showing the schematic structure of a 2D symbol reader according to the second embodiment.

FIG. 17 is a view showing the schematic structure of a 2D symbol reader according to the second embodiment. A line sensor is used to read a 2D symbol while conveying a calibration-specific sheet 5500. An area sensor is preferably used to read a 2D symbol while the calibration-specific sheet stands still. In the second embodiment, a line CMOS sensor 1701 is arranged behind the pickup roller of the manual feeder. When the user sets the calibration-specific sheet 5500 at the manual feeder and designates execution of automatic tone correction, the calibration-specific sheet 5500 is conveyed to the sheet feed standby position. During conveyance, a 2D symbol 1702 is read.

The light source is a line LED 1705, and reflected light of light emitted from the light source is guided to the CMOS sensor 1701 via a mirror 1703 and lens 1704. Since the 2D symbol has a large information amount, the lens 1704 is preferably inserted in the optical path to increase the resolution and condense diffused light.

The embodiment may adopt an area sensor instead of the line sensor to read calibration information recorded in a 2D symbol when the user sets the calibration-specific sheet 5500 at the manual feeder.

Alternatively, the embodiment may read calibration information recorded in a 2D symbol when the user sets the calibration-specific sheet 5500 in the sheet feed cassette.

(Calibration Using Spectral Reflectance)

An example of correcting variations between lots of calibration-specific sheets 5500 will be described as an example of calibration using the spectral reflectance. FIG. 18 is a view showing a schematic model for the calibration-specific sheet 5500 and a color material 1800. Letting r be the spectral reflectance of the calibration-specific sheet 5500 serving as the background, T be the transmittance of light passing through the color material 1800, and I be the incident light quantity, reflected light R is given by $$R = I \times r \times T^2 \quad (8)$$

If the amount of toner application of the color material is constant, the transmittance T is also constant, and reflected light R is dominated by the spectral reflectance characteristic r of the background (calibration-specific sheet). The spectral reflectance characteristic r is measured in preparing the calibration-specific sheet 5500, and recorded in the 2D symbol. Recording of information in the 2D symbol will be described in detail later.

When executing calibration, the image forming apparatus 1030 can read the spectral reflectance characteristic r of the calibration-specific sheet 5500 by reading the 2D symbol by the 2D symbol in the image forming apparatus 1030. The reflectance R at the target amount of toner application can be calculated by substituting the read spectral reflectance characteristic r into equation (8).

FIG. 19 is a graph showing the relationship between the calibration-specific sheet 5500 and the spectral characteristic of toner. The 2D symbol reader (spectral reflectance input portion) reads wavelength data of 380 nm to 730 nm at intervals of 10 nm from information recorded in the 2D symbol. The reflectance R is calculated for the 36 wavelength data. A curve 1901 having three peaks indicates the sensitivity characteristic of the color sensor, and is obtained by integrating the color filter characteristics rF, gF, and bF and the photodiode characteristic PD. The detection values of the respective filters are given by $$\text{Red} = \Sigma(R(\lambda) \times rF(\lambda) \times PD(\lambda)) \quad (9)$$

$$\text{Green} = \Sigma(R(\lambda) \times gF(\lambda) \times PD(\lambda)) \quad (10)$$

$$\text{Blue} = \Sigma(R(\lambda) \times bF(\lambda) \times PD(\lambda)) \quad (11)$$

In equations (9) to (11), λ takes a value of 380 nm to 730 nm at intervals of 10 nm.

After the spectral reflectance characteristic r of the background is obtained, a target luminance value which gives a desired amount of toner application can be calculated. The amount of toner application always becomes constant regardless of variations between lots of calibration-specific sheets 5500 and the like.

(Calibration Using Grammage Information)

Calibration using grammage information will be described. Grammage information must be considered in an electrophotographic image forming apparatus 1030 mainly using a hot press fixing portion. The hot press fixing portion fuses toner to apply and fix it onto a sheet. Not all heat and pressure are applied to toner, and they are also applied to a sheet. The heat capacity applied to toner changes depending on the sheet thickness. For this reason, when processing a thick sheet, a general electrophotographic image forming apparatus 1030 takes a measure to decrease the sheet convey speed and increase the fixing temperature by performing the fixing step a plurality of number of times.

Changes of the temperature and pressure to toner are important factors associated with the transmittance T of light passing through the color material in equation (8). Toner is formed from particles of several μm. If toner does not fuse and keeps the shapes of toner particles, the external additive in toner, wax, and the like unchanged, internal scattering frequently occurs, decreasing the transmittance T.

Figure 20A:
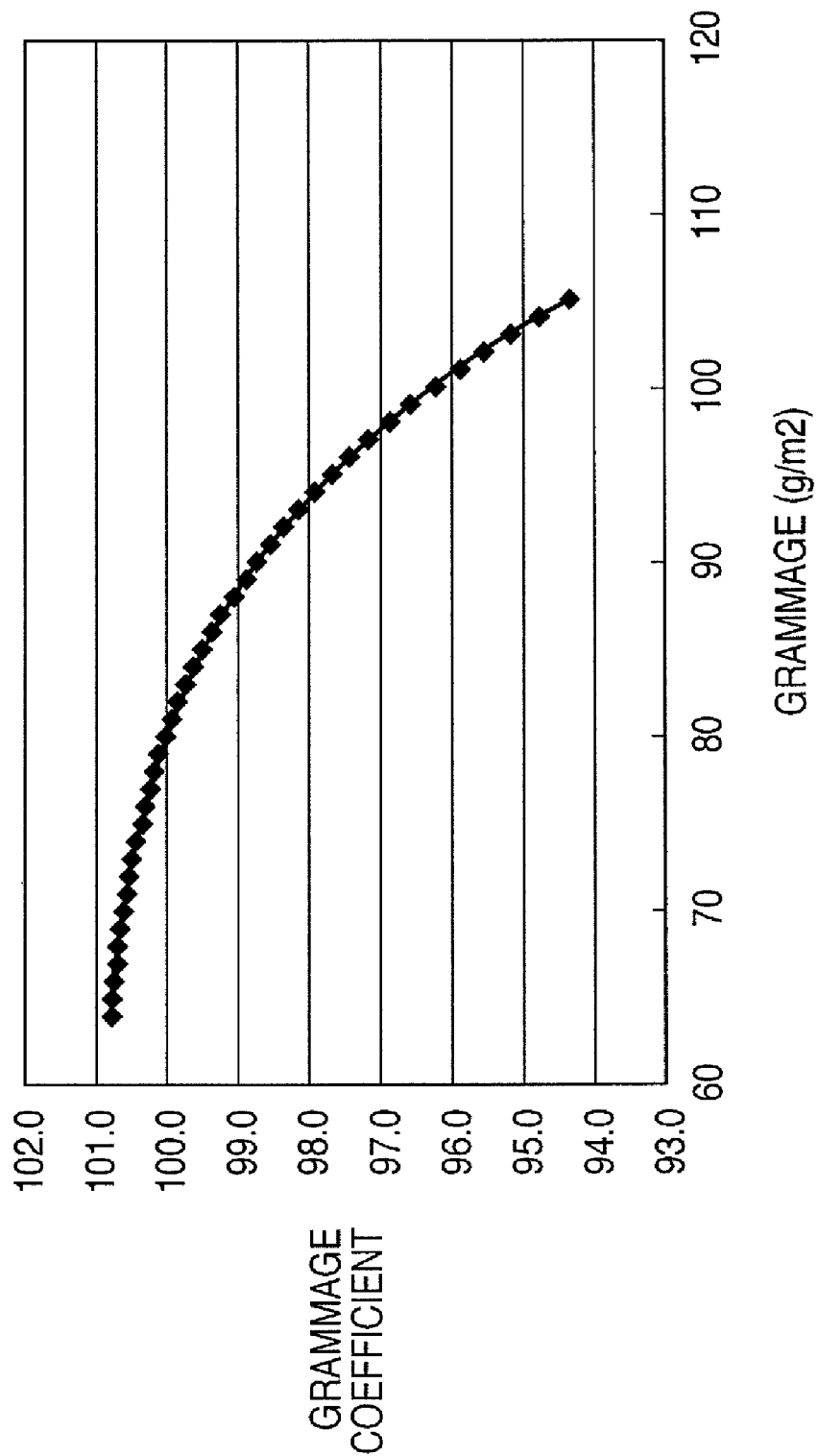
FIG. 20A is a graph showing the increase/decrease of the grammage coefficient G upon a change of the grammage.

FIG. 20A is a graph showing the increase/decrease of the grammage coefficient G upon a change of the grammage. Mainly considering an 80 g/m² sheet, the grammage coefficient (ordinate axis) decreases as the grammage (abscissa axis) increases, and slightly increases as the grammage decreases. FIG. 20B shows a lookup table (LUT) representing the relationship between the grammage and the grammage coefficient G. By looking up the LUT in executing calibration, the transmittance T considering the toner fusing characteristic can be determined.

For example, when automatic tone correction is performed for a 64 g/m² calibration-specific sheet 5500 in FIG. 20B, the LUT is used to calculate the grammage coefficient G=100.8%.

This value is substituted into the following equation (12) to obtain the transmittance T corresponding to the grammage.

For a 105 g/m² sheet, the grammage coefficient G=94.3%. The grammage coefficient G in the LUT is so normalized as to adjust the grammage coefficient G for the grammage "80 g/m²" to 1 (100%).

$$\text{Grammage coefficient } G(\%) = \text{transmittance } T/\text{reference transmittance } T\text{ref} \times 100 \quad (12)$$

Sheets called plain sheets (wood-free sheets) of 64 to 105 g/m² in grammage are employed as calibration-specific sheets 5500. The reference transmittance Tref represents the toner transmittance of the standard 80 g/m² sheet among the calibration-specific sheets 5500.

In grammage information-based calibration, the transmittance T of toner is calculated from equation (12). Based on the transmittance T, the final reflectance R can be calculated by equation (8), and the detection values of the respective filters can be calculated by equations (9) to (11).

The reference transmittance Tref takes a fixed value of the model. The target luminance value can be calculated from this fixed value in consideration of the grammage and the spectral reflectance characteristic r of the calibration-specific sheet 5500. This calculation can adjust the maximum amount of toner application of the color material free from the influence of the type (color and grammage) of calibration-specific sheet and the difference between lots.

(Storage of Data in Color Information-free 2D Symbol)

The preparation of the calibration-specific sheet 5500 with the 2D symbol used in the second embodiment (similarly used in the third and fourth embodiments to be described later) will be explained. The feature of the calibration-specific sheet 5500 is that the spectral reflectance and grammage information are added to the 1D symbol.

Grammage information is a predetermined specification of the calibration-specific sheet, and the grammage value suffices to be input to 2D symbol generation software.

As for the spectral reflectance, data is measured by a spectroreflectometer for each sheet lot or roll, and the spectral reflectance value is input to the 2D symbol generation software. The spectroreflectometer can communicate data via various interfaces. For example, the spectroreflectometer inputs measurement information to an information processing apparatus via an RS232C interface. The information processing apparatus inputs the spectral reflectance information to the 2D symbol generation software to generate a 2D symbol. The 2D symbol is imposed by imposition software in accordance with the sheet size, and printed similarly to the 1D symbol. Resultantly, the calibration-specific sheet 5500 bearing calibration information can be prepared.

(Calibration Sequence)

Figure 21A:
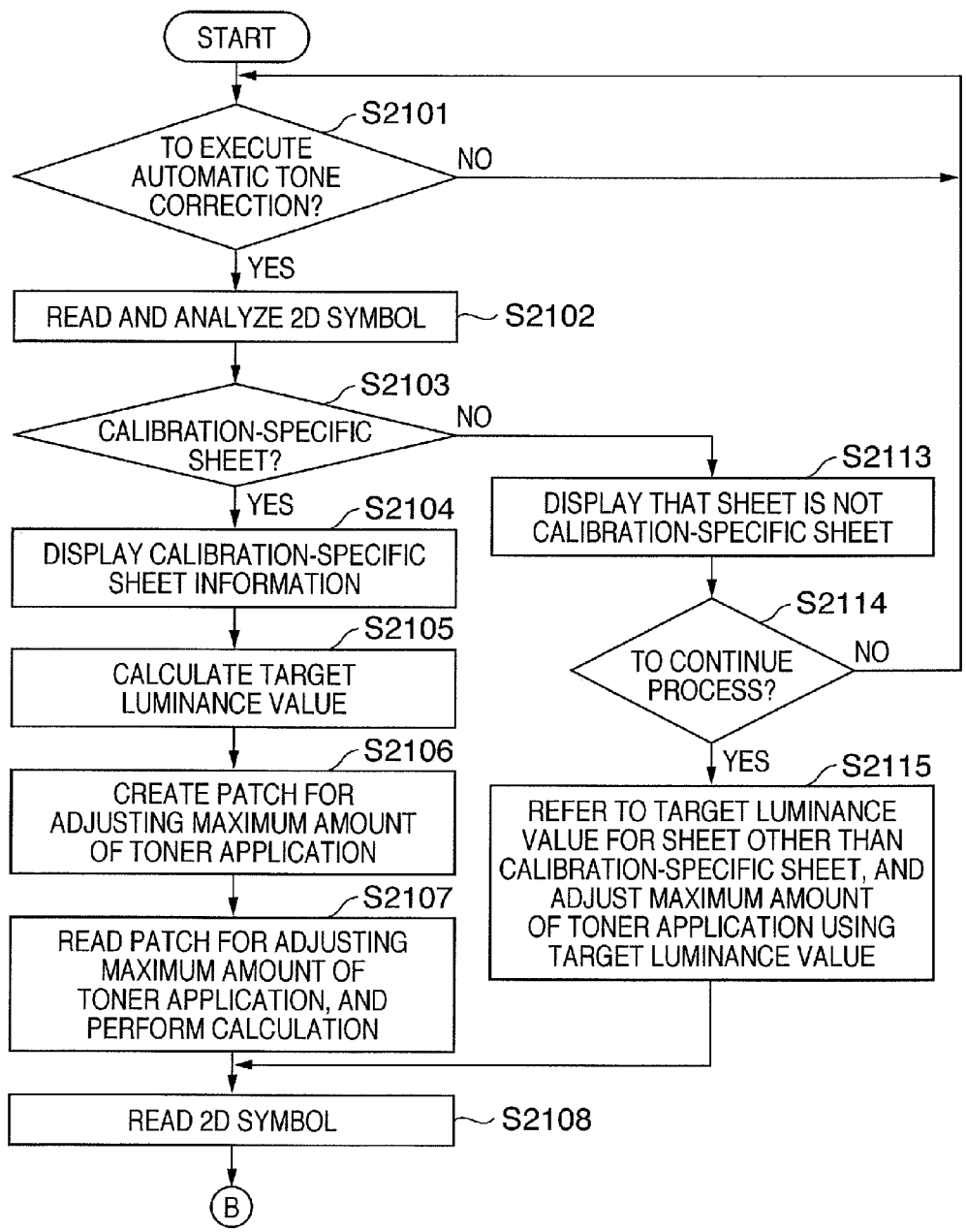
FIGS. 21A and 21B are flowcharts for explaining an image control sequence according to the second embodiment.
Figure 21B:
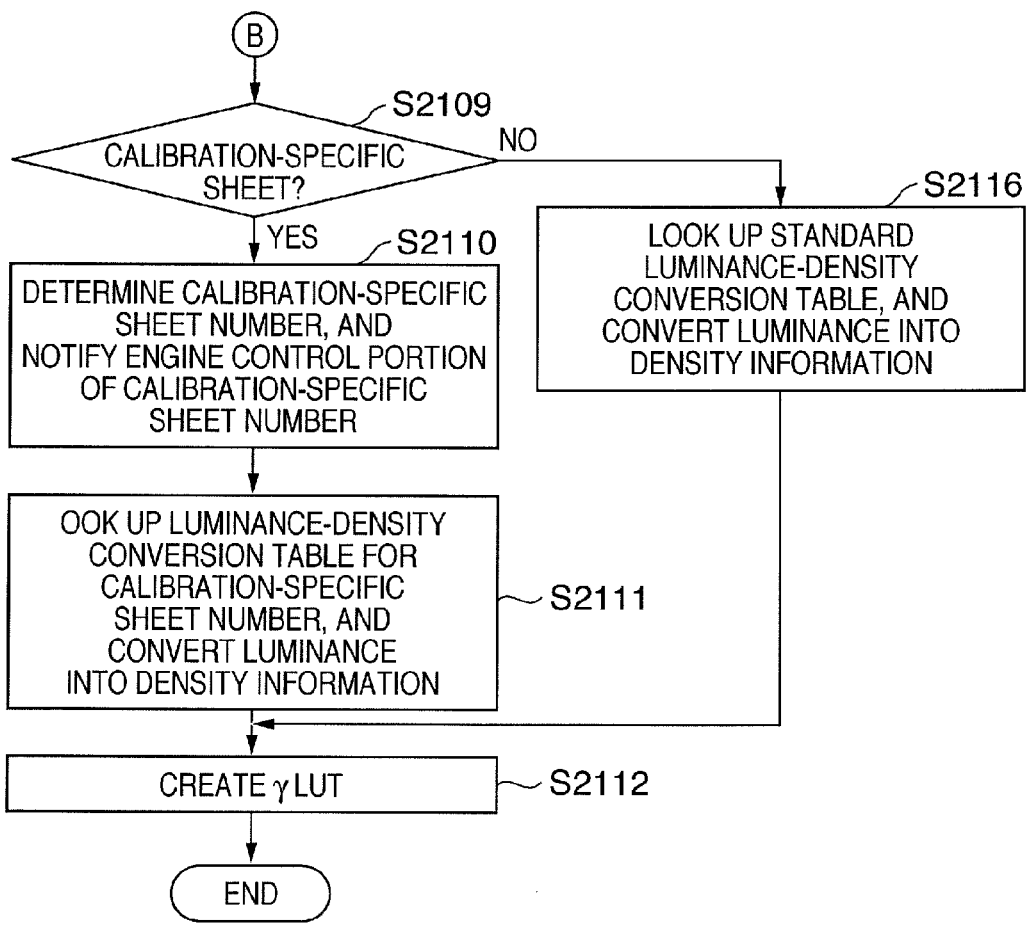

An image control sequence using the 2D symbol in the second embodiment will be explained with reference to the flowcharts of FIGS. 21A and 21B.

In step S2101, an instruction to execute automatic tone correction is input (YES in S2101), and the process shifts to image control processing according to the second embodiment.

In step S2102, the 2D symbol reader (FIG. 17) reads and analyzes a 2D symbol. The 2D symbol information contains the type of calibration-specific sheet 5500, the manufacturing factory number, the lot number, brightness information, and information on the spectral reflectance and grammage.

If it is determined in step S2103 that the sheet is the calibration-specific sheet 5500 (YES in S2103), the process advances to step S2104.

In step S2104, the type of calibration-specific sheet 5500 obtained by the analysis of the 2D symbol is determined. A printer controller 1031 notifies an engine control portion 1049 of the determination result, and displays the determination result as information of the calibration-specific sheet 5500 on an operation panel 1037 (S2104).

If it is determined in step S2103 that no 2D symbol is detected, the printer controller 1031 notifies the engine control portion 1049 that the sheet is not the calibration-specific sheet 5500. The printer controller 1031 displays this determination result on the operation panel 1037 (S2113).

In step S2114, it is determined whether to continue the process. If it is determined not to continue the process (NO in S2114), the process returns to step S2101. If it is determined to continue the process (YES in S2114), the process advances to step S2115.

In the process of step S2115, a target luminance value in a case of not using the calibration-specific sheet 5500 is specified from the table in FIG. 15, and an LPW which implements the target luminance value is calculated to adjust the maximum amount of toner application. This process corresponds to step S1415 in FIG. 14A.

In step S2105, the target luminance value is calculated from the spectral reflectance characteristic and grammage information read from the 2D symbol.

In step S2106, a patch image for adjusting the maximum amount of toner application is formed.

In step S2107, a color sensor 3000 reads the patch image for adjusting the maximum amount of toner application to attain the relationship between the luminance value and LPW of each patch image (see FIG. 10). Then, an LPW which gives the target luminance value is calculated.

In step S2108, the 2D symbol reader reads the 2D symbol to look up the luminance-density conversion table on the basis of information (number of 0 to 9) for specifying the type of calibration-specific sheet 5500. If the sheet is not the calibration-specific sheet 5500, a preset standard curve indicating the relationship between the luminance and the density is referred to.

If it is determined in step S2109 that the sheet is the calibration-specific sheet 5500 (YES in S2109), the process advances to step S2110. In step S2110, the type of calibration-specific sheet 5500 obtained from the 2D symbol is determined, and the printer controller 1031 notifies the engine control portion 1049 of the determination result.

If it is determined in step S2109 that no 2D symbol is detected, the printer controller 1031 notifies the engine control portion 1049 that the sheet is not the calibration-specific sheet 5500. Then, the process advances to step S2116.

Conversion into density information in steps S2111 and S2116 corresponds to steps S1413 and S1416 in FIG. 14B in the first embodiment, and a normalized luminance detection value is converted into density information. If the sheet is not the calibration-specific sheet 5500 (S2116), a luminance normalized by the preset standard curve is converted into a density.

Step S2112 corresponds to step S1414 in FIG. 14B, and a density correction table creation portion 1045 in the printer controller 1031 generates a density correction table γLUT. The density correction table creation portion 1045 generates the density correction table γLUT so that an output image attains a desired density tone. For a desired density tone, the γLUT is preferably created to make the tone characteristic of the image forming apparatus 1030 linear to the cumulative color difference, as described in the first embodiment.

The second embodiment adjusts image forming conditions on the basis of information of the calibration-specific sheet 5500 including the spectral reflectance and grammage. The second embodiment can provide high image quality regardless of the influence of the lot difference and factory difference of the calibration-specific sheet 5500.

The second embodiment can provide an image forming technique of suppressing an image error and implementing high image quality by performing tone correction in accordance with the type of recommended sheet for use.

In addition, the second embodiment can provide a storage medium available to correct image forming conditions in the image forming apparatus.

Modification to Second Embodiment

In the first and second embodiments, the process starts on the basis of the automatic tone correction execution instruction (YES in S1401 or YES in S2101) by the user. However, the process may start when the calibration-specific sheet 5500 is set at the manual feeder, regardless of input of the execution instruction from the user.

An example of the structure of the 2D symbol reader described in the second embodiment may adopt an optical system in which an area sensor replaces the line sensor and the light source changes from the line LED 1705 to an He—Ne laser. This optical system is of a raster type called triaxial scanning (to be also referred to as a "triaxial reader" hereinafter). Raster triaxial scanning is preferable because the plane of a 2D symbol can be scanned.

The triaxial reader can read even information recorded in a 1D symbol (e.g., "interleaved 2 of 5") falling within the read range (area of about 4 cm square). Automatic tone correction described in the first embodiment can be executed by referring to a target luminance value (FIG. 15) corresponding to the type of calibration-specific sheet 5500 read by the triaxial reader.

The triaxial reader can execute automatic tone correction regardless of whether information marked on the calibration-specific sheet 5500 is 1D information or 2D information.

Third Embodiment

The third embodiment will describe an arrangement in which a state (tone correction result) immediately after executing tone correction with a calibration-specific sheet 5000 or 5500 is reflected in a sheet other than the calibration-specific sheet 5000 or 5500.

Figure 24:
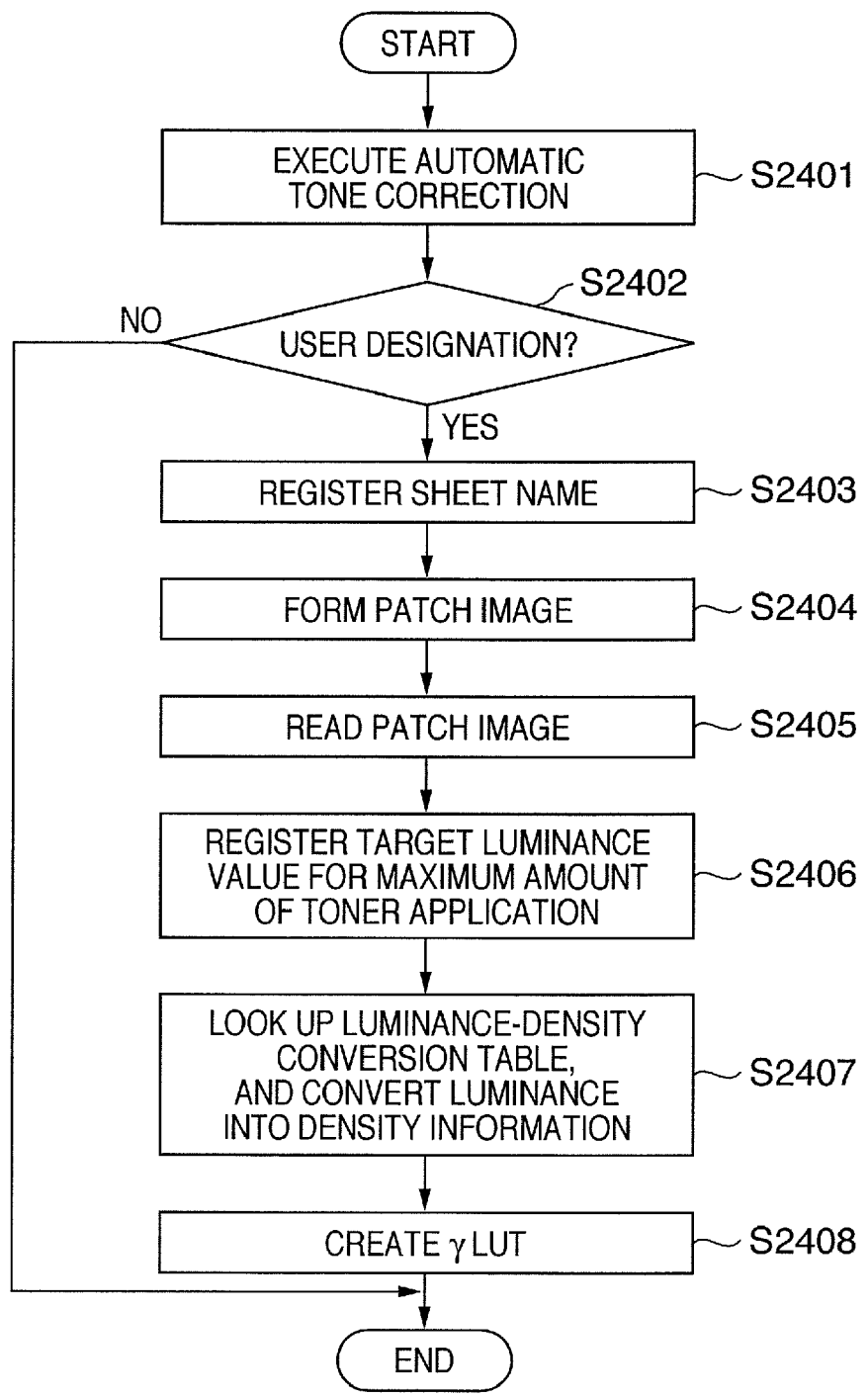
FIG. 24 is a flowchart for explaining a processing sequence according to the third embodiment.

FIG. 24 is a flowchart for explaining a processing sequence according to the third embodiment.

In step S2401, automatic tone correction according to the first or second embodiment using the calibration-specific sheet 5000 or 5500 is executed.

In step S2402, an operation panel 1037 displays a registration window (not shown) which inquires whether a sheet other than the calibration-specific sheets 5000 and 5500 is registered as a user-designated sheet. The user can register the name of a desired sheet via the registration window. If the user does not designate registration (NO in S2402), the process ends.

If the user registers a sheet name via the registration window (YES in S2402, and S2403), the process advances to step S2404, and an image forming apparatus 1030 forms a patch image on the sheet. The formed patch image reflects tone correction executed in step S2401. Since the maximum amount of toner application has already been adjusted, at least one patch image suffices to be formed for each color (Y, M, C, and K).

In step S2405, a color sensor 3000 reads the patch image.

In step S2406, a luminance value is obtained from the read result of the color sensor 3000 under the control of a CPU 1033, and registered as a target luminance value for the maximum amount of toner application.

In step S2407, the target luminance value for the maximum amount of toner application is converted into a density. At this time, the target luminance value for the maximum amount of toner application, which is normalized by referring to a preset standard curve, can be converted into a density. As the standard curve, a pattern different from that for the calibration-specific sheet 5000 or 5500 may be set. It is also possible to set the relationship between the luminance and density of a typical calibration-specific sheet (e.g., No. 1 in FIG. 15) as a standard curve.

In step S2408, a density correction table creation portion 1045 in a printer controller 1031 generates a density correction table γLUT so that an output image attains a desired density tone. Then, the process ends.

By the above process, even when no calibration-specific sheet is always available, a state (tone correction result) immediately after correction with the calibration-specific sheet can be reflected in a sheet other than the calibration-specific sheet.

Fourth Embodiment

An image forming apparatus according to the fourth embodiment implements an arrangement which further increases the calibration precision by managing the fixing temperature. Generally, the condition to start image formation in an image forming apparatus 1030 is managed at a fixing temperature of 150° C. to 180° C. The fixing temperature varies within the range of several ten ° C., and the toner transmittance T described in the second embodiment changes depending on the fixing temperature. The fixing temperature is detected by thermistors at the center and end of the fixing roller, and controlled by turning on/off the heater by an engine control portion 1049. For example, in the image forming apparatus 1030 during continuous output, the toner and sheet may deprive the fixing roller of heat, abruptly decreasing the temperature of the fixing roller. In this case, if automatic tone correction is executed immediately after the print job, the transmittance T of a calibration-specific sheet 5500 may decrease from that at an expected temperature. To minimize the influence of the decrease in fixing temperature, the fixing temperature condition at the start of automatic tone correction is made stricter than a normal image formation start condition.

The engine control portion 1049 can control the fixing temperature detected by the thermistor. If an allowable fixing temperature condition (temperature range condition stricter than a normal image formation start condition: e.g., 170° C.±5° C.) is satisfied in executing automatic tone correction, automatic tone correction starts under comprehensive control of a CPU 1033. If no fixing temperature condition is satisfied, the engine control portion 1049 adjusts the fixing temperature. During adjustment, the image forming apparatus 1030 waits until the fixing temperature falls within the allowable fixing temperature condition.

The fourth embodiment can implement the arrangement which further increases the calibration precision by managing the fixing temperature under a fixing temperature condition narrower than a temperature range used to execute a normal print job.

Fifth Embodiment

The fifth embodiment provides a calibration-specific sheet capable of executing higher-precision calibration in order to exclude variations between calibration-specific sheets in the manufacturer, and the influence of contamination, scratches, paper dust, and the like.

Assume that patch images of each color used for tone control in automatic tone correction are printed in advance on a calibration-specific sheet in addition to a 2D symbol. The 2D symbol additionally records information on these patch images as calibration information. Thus, the information amount is larger than that in the second embodiment, and the 2D symbol becomes larger in physical size than that in the second embodiment. Information recorded in the 2D symbol contains the target luminance value and density value of each patch image.

Information on patch images of each color contains the number of patches (10 patches of different tone levels+one white patch=11 patches), density information (three digits of 0 to 255), and the target luminance value (three digits of 0 to 255). Hence, information on patch images increases by (three digits+three digits)×11×4=264 digits for four, C, M, Y, and K colors.

The information on patch images are added to 75-digit information used in the second embodiment containing information on the white spectral reflectance characteristic and grammage information, and 11-digit information containing the type of calibration-specific sheet 5000 used in the first embodiment, resulting in (264+75+11)=350 digits.

When the number of calibration-specific sheet types is 10 (Nos. 0 to 9), the number of pieces of information is 3,500. The 2D symbol can store a maximum of 7,089 pieces of character information and store the above-described calibration information.

Tones for 10 patch images of different tone levels and one white patch image=11 patch images represent patch images by image signals of 0% to 100% at intervals of 10%. These patch images are read by a color sensor 3000, and compared with a target luminance value and density information stored in the 2D symbol to correct a color sensor output on the basis of the comparison result.

In automatic tone correction according to the first and second embodiments described above, the luminance-density conversion table is looked up for each sheet type. In the fifth embodiment, the luminance-density conversion table is created again on the basis of information read from the 2D symbol.

FIG. 22 is a table illustrating part of cyan calibration information recorded in the 2D symbol. The table records density information and target luminance values for image signals of 0% to 100% at intervals of 10%. A luminance-density conversion table (to be referred to as a "second luminance-density conversion table") is obtained from these two types of calibration information. The relationship between the image signal and the density is derived from the newly obtained second luminance-density conversion table, and the γLUT is so generated as to attain a desired density tone.

(2D Symbol which Records Measurement Information of Patch Image)

A calibration-specific sheet bearing measurement information of a patch image used in the fifth embodiment will be explained. Features of the calibration-specific sheet are that a patch image is printed in advance and that density information of the patch image and a target luminance value read by the color sensor are recorded. The patch image is printed using a reference image forming apparatus 1030. More specifically, a calibration-specific sheet having undergone up to cutting is set in the reference image forming apparatus 1030 to form a patch image.

The ink characteristic (spectral reflectance) of offset printing does not completely coincide with the color material characteristics of inkjet printing and electrophotographic printing. For this reason, the sensor reads patch images of the same color material printed by the image forming apparatus 1030 to calculate a luminance value (target luminance value). The densitometer measures the patch images to obtain a density value. The obtained luminance value (target luminance value) and density information of the patches are recorded in the 2D symbol together with other pieces of calibration information known in advance.

If the 2D symbol passes again through the fixing portion, convey path, and the like for re-printing, contamination or an offset image may be generated. To prevent this, the 2D symbol is preferably printed using a 2D symbol label printer.

The 2D symbol output from the 2D symbol label printer is adhered at a designated position on a calibration-specific sheet, completing the calibration-specific sheet bearing the 2D symbol which records measurement information of the patch image.

The fifth embodiment can execute higher-precision calibration without any variations between calibration-specific sheets in the manufacturer, and any influence of contamination, scratches, paper dust, and the like.

Sixth Embodiment

The sixth embodiment will explain the arrangement of an image forming apparatus 1030 which uses the RFID (Radio Frequency Identification) serving as an element for saving calibration information and communicates calibration information with the RFID.

The RFID may hold calibration information together with or instead of the above-described 2D symbol.

When both the RFID and 2D symbol are used, the image forming apparatus 1030 can read calibration information by either the 2D symbol reader or a reader which communicates with a transponder to be described later.

Figure 23:
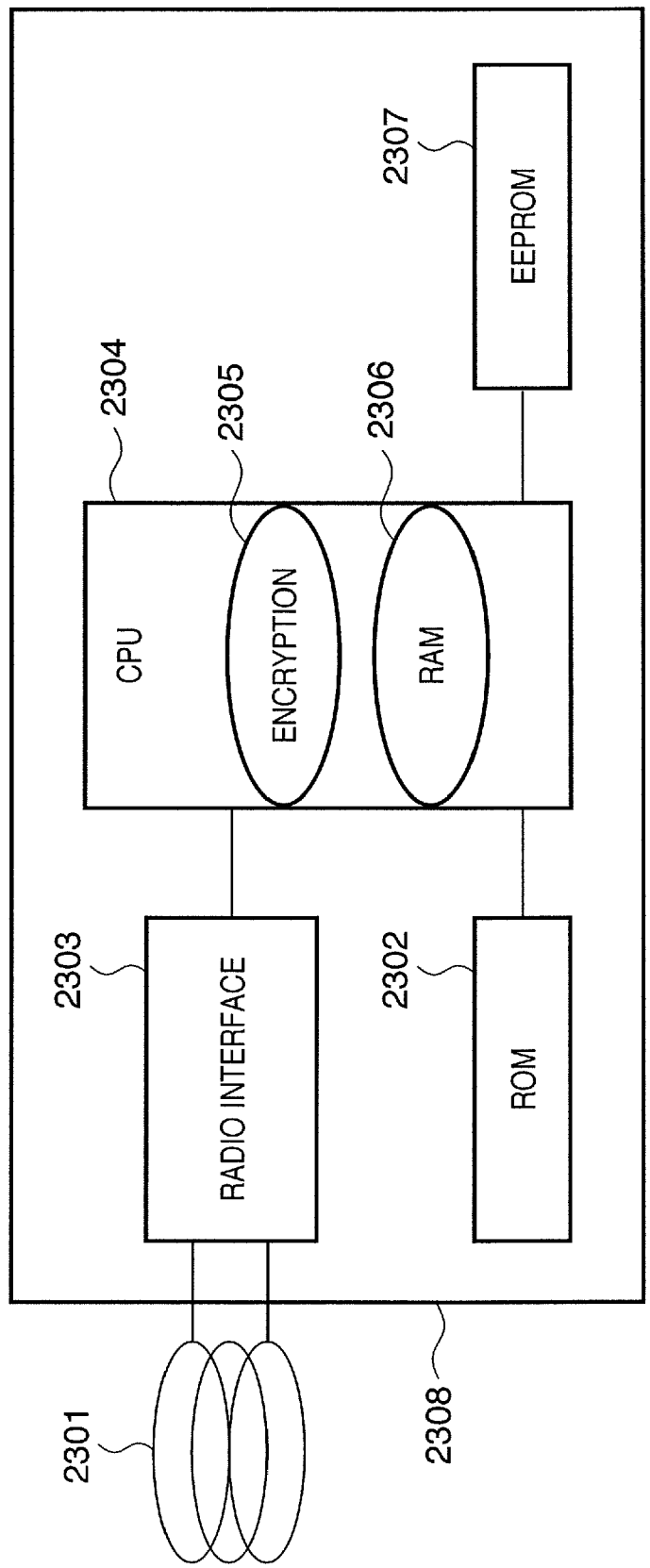
FIG. 23 is a block diagram showing the schematic arrangement of a non-contact data carrier (transponder) which forms an RFID according to the sixth embodiment.

FIG. 23 is a block diagram showing the schematic arrangement of a noncontact data carrier (to be referred to as a "transponder" hereinafter) which forms the RFID adhered on a calibration-specific sheet. A coil 2301 can be formed by screen printing. The coil 2301 connects to a chip 2308 via a radio interface 2303. The radio interface 2303 transmits/receives data to/from a CPU 2304 in the chip 2308. The CPU 2304 incorporates an encryption module 2305 and RAM 2306. The CPU 2304 connects to a ROM 2302 which stores an operating system, and an EEPROM 2307 which stores calibration information.

In the sixth embodiment, the EEPROM 2307 of the transponder of the RFID adhered on a calibration-specific sheet stores calibration information which is recorded in the 2D symbol in the fifth embodiment.

The image forming apparatus 1030 communicates with the transponder to read calibration information and execute the process described in the first to fifth embodiments. The image forming apparatus 1030 comprises a wireless communication portion ("reader": generally a PCD (Proximity Card Device)) which transmits/receives information to/from the transponder instead of the 2D symbol reader. The reader is of a proximity type, and has a read range of 0 to 10 cm. If a calibration-specific sheet bearing the RFID is conveyed within the read range of the reader, the reader can communicate with the transponder. The detailed read characteristic of the reader complies with ISO/IEC14443 (JIS X 6322).

To communicate with the transponder and supply energy to drive it, the reader transmits 13.56-MHz radio waves toward the transponder. The physical characteristic, power transmission, signal interface, initialization, collision avoidance, and transmission protocol comply with ISO/IEC14443.

To receive transponder information, a CPU 1033 outputs a search instruction to the reader to search for the transponder within the read range. The reader starts searching for the transponder.

If the transponder responds to the search by the reader and the reader determines that the transponder exists within the read range, the reader starts authenticating the transponder. The transponder transmits, for example, a calibration-specific sheet number (0 to 9) stored in the EEPROM 2307 to the reader. The reader collates the number transmitted from the transponder, and if determining as a result of collation that the sheet is the calibration-specific sheet, sends an information transmission request to the transponder to cause it to transmit calibration information. In this case, the sheet is authenticated as a calibration-specific sheet when the calibration-specific sheet number is one of 0 to 9 as shown in FIG. 15, and authenticated as another sheet when the number is another one (or information).

In accordance with the information transmission request sent from the reader, the transponder transmits calibration information stored in the EEPROM 2307 to the reader. Upon reception of the calibration information, the reader sends it to an engine control portion 1049. At this stage, the image forming apparatus 1030 completes the acquisition of the calibration information from the calibration-specific sheet, and can execute density tone control in the fifth embodiment or the like described above. Concrete control contents overlap the description of the fifth embodiment or the like, and a detailed description thereof will be omitted.

(Transponder which Records Measurement Information of Patch Image)

Information can be stored in the EEPROM 2307 of the transponder by the same sequence as that for information obtained by recording patch image information in the 2D symbol. Procedures to store information in the EEPROM 2307 of the transponder will be explained.

The main part of the transponder comprises the microchip 2308 and the coil 2301, as shown in FIG. 23.

The microchip 2308 is formed on a silicon wafer, similar to the semiconductor manufacturing process. Several hundreds to several thousands of microchips are simultaneously formed through the doping step, developing step, etching step, cleaning step, and the like. The microchip 2308 formed on the silicon wafer is cut with a diamond cutter.

The coil can be formed by various methods, for example, by screen printing. According to this method, many coils are produced by printing them on a polyvinyl chloride sticker. A metal screen is used as a plate, and coated with a photosensitive agent. After the exposure step, washing step, and the like, the metal screen is removed to form a coil. A conductive polymer ink is used as a printing ink, and can be made from a metal powder, solvent, and fixing resin.

The prepared microchip 2308 and coil 2301 are joined to each other. The joint preferably uses a conductive adhesive. After the joint, the process shifts to the laminating step. A transponder formed on the sticker in this way is about 0.1 mm thick, and is adhered to a calibration-specific sheet bearing a patch image, similarly by the 2D symbol label printer.

The transponder (FIG. 23) on the sticker can store density information of a patch image, a target luminance value read by the color sensor, and other information of the calibration-specific sheet.

An information storage device which stores calibration information in the transponder can take the same arrangement as that of the reader in the image forming apparatus 1030. The information storage method can be, for example, amplitude shift keying (amplitude modulation). In general, a reader which transmits a 13.56-MHz electromagnetic wave as a carrier modulates the electromagnetic wave to transmit a signal when transmitting data and instructions to the transponder. The modulation method includes amplitude modulation employed in the sixth embodiment, frequency modulation, and phase modulation. Amplitude modulation is often adopted for easy demodulation.

The sixth embodiment can execute higher-precision calibration by communicating calibration information using the RFID without any influence of contamination, scratches, and the like of the 2D symbol and the like.

Modification to Fifth and Sixth Embodiments

The fifth and sixth embodiments have described the sensor output correction method for a single color. In gray balance control and the like, an output from an RGB sensor can also be converted into the device-independent XYZ or L*a*b* color space. In this case, the RGB color space can be converted into the XYZ color space or the like on the basis of a color conversion table "multidimensional LUT" called an ICC profile.

The fifth and sixth embodiments create a sensor adjustment image (patch image) in a single color in order to execute single-color tone correction in the image forming apparatus 1030. When the image forming apparatus 1030 converts an input signal using the multidimensional LUT to correct the gray balance of the image forming apparatus 1030 or the like, the multidimensional LUT must be changed. This is because the combination of the colors of detected R, G, and B signals changes (e.g., R is adjusted but G and B are not adjusted) due to sensor contamination or the like even when patch images of the same color are detected.

Even if this phenomenon occurs, the multidimensional LUT for input and output 3D spaces used to convert R, G, and B into R', G', and B' can be created by storing R, G, and B signals read in advance in the 2D symbol or transponder.

By storing XYZ or L*a*b* information serving as chromaticity information of the patch image, RGB information can be converted into the chromaticity (XYZ or L*a*b*).

The correlation can be grasped from the chromaticity of an output material and a value obtained by reading the output material by the reader (color sensor), and may be formed into a table.

The present invention can provide an image forming apparatus capable of suppressing a detection error which cannot be corrected with a single color by recording or storing patch images of multiple colors and their measurement information.

Other Embodiment

The object of the present invention is also achieved by supplying a storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100379, filed Mar. 31, 2006, which is hereby incorporated by reference herein in its entirety.

What is claimed is:

1. An image forming apparatus comprising:
   an image forming unit that forms a calibration image on a print medium;
   a receiving unit that receives a sheet type of a recommended calibration sheet input from a user in a case where the print medium is the recommended calibration sheet;
   a setting unit that sets a calibration condition corresponding to the sheet type of the recommended calibration sheet received by said receiving unit;
   a correction unit that corrects an image forming condition of said image forming unit based on the calibration condition set by said setting unit; and
   a reading unit that outputs the calibration image formed on the print medium as a luminance,
   wherein said setting unit sets, as the calibration condition, a luminance-density conversion table representing a relationship between the luminance and a density corresponding to a relationship between the sheet type of the recommended calibration sheet and the color material.

2. An image forming apparatus comprising:
   an image forming unit that forms a calibration image on a print medium;
   a receiving unit that receives a sheet type of a recommended calibration sheet input from a user in a case where the print medium is the recommended calibration sheet;
   a setting unit that sets a calibration condition corresponding to the sheet type of the recommended calibration sheet received by said receiving unit; and
   a correction unit that corrects an image forming condition of said image forming unit based on the calibration condition set by said setting unit,
   wherein said setting unit sets, as the calibration condition, a target value corresponding to the sheet type of the recommended calibration sheet, in order to implement a maximum amount of toner application of a color material which is independent to the sheet type of the recommended calibration sheet.

3. The apparatus according to claim 2, wherein in a case where the print medium is not the recommended calibration sheet, said setting unit sets, as the calibration condition, a target value which gives an amount of toner application of the color material less than the maximum amount of toner application of the color material on the recommended calibration sheet.

4. The apparatus according to claim 2, further comprising:
   a reading unit that outputs the calibration image formed on the print medium as a luminance,
   wherein said setting unit sets, as the calibration condition, a luminance target value of an output from said reading unit in accordance with the sheet type of the recommended calibration sheet.

5. The apparatus according to claim 4, wherein in a case where the print medium is not the recommended calibration sheet, said setting unit sets the luminance target value greater than the luminance target value for the recommended calibration sheet.

6. The apparatus according to claim 2, further comprising:
   a reading unit that outputs the calibration image formed on the print medium as a luminance,
   wherein said setting unit sets, as the calibration condition, a luminance target value of an output from said reading unit in accordance with a relationship between the type of the recommended calibration sheet and the color material.

7. The apparatus according to claim 2, further comprising:
   a reading unit that outputs the calibration image formed on the print medium as a luminance,
   wherein said setting unit sets, as the calibration condition, a luminance-density conversion table representing a relationship between the luminance and a density which correspond to the sheet type of the recommended calibration sheet.

8. The apparatus according to claim 7, wherein in a case where the print medium is not the recommended calibration sheet, said setting unit sets a preset luminance-density conversion table.

9. The apparatus according to claim 2, further comprising:
   a reading unit that outputs the calibration image formed on the print medium as a luminance,
   wherein said setting unit further sets, as the calibration condition, a luminance-density conversion table representing a relationship between the luminance and a density corresponding to a relationship between the sheet type of the recommended calibration sheet and the color material.

10. An image forming apparatus comprising:
    an image forming unit that forms a predetermined image on a sheet;
    a reading unit that reads the predetermined image formed by said image forming unit;
    an obtaining unit that obtains a sheet type of the sheet;
    a determination unit that determines an image forming condition of said image forming unit based on a reading result of the predetermined image by said reading unit and the sheet type obtained by said obtaining unit; and
    a setting unit that sets a calibration condition corresponding to the sheet type obtained by said obtaining unit,
    wherein said setting unit sets a target value corresponding to the sheet type as the calibration condition.

11. The image forming apparatus according to claim 10, wherein said setting unit sets, as the calibration condition, a luminance-density conversion table representing a relationship between a luminance of an output from said reading unit and a density corresponding to a relationship between the sheet type obtained by said obtaining unit and the color material.

12. The image forming apparatus according to claim 10, wherein in a case where the sheet is not a recommended calibration sheet, said setting unit sets, as the calibration condition, a target value which gives an amount of toner application of the color material less than a maximum amount of toner application of the color material on the recommended calibration sheet.

13. The image forming apparatus according to claim 12, wherein in a case where the sheet is not the recommended calibration sheet, said setting unit sets the luminance target value greater than the luminance target value for the recommended calibration sheet.

14. The image forming apparatus according to claim 10, wherein said setting unit sets, as the calibration condition, a luminance target value of an output from said reading unit in accordance with the sheet type obtained by said obtaining unit.

15. The image forming apparatus according to claim 10, wherein said setting unit sets, as the calibration condition, a luminance target value of an output from said reading unit in accordance with a relationship between the sheet type and the color material.

16. The image forming apparatus according to claim 10, wherein said setting unit sets, as the calibration condition, a luminance-density conversion table representing a relationship between a luminance of an output from said reading unit and a density corresponding to the sheet type obtained by said obtaining unit.

17. The image forming apparatus according to claim 16, wherein in a case where the sheet is not a recommended calibration sheet, said setting unit sets a preset luminance-density conversion table.

\* \* \* \* \*